United States Patent
Kaplan et al.

(10) Patent No.: US 7,827,029 B2
(45) Date of Patent: *Nov. 2, 2010

(54) SYSTEMS AND METHODS FOR USER-INTEREST SENSITIVE NOTE-TAKING

(75) Inventors: Ronald Kaplan, Palo Alto, CA (US); Richard Crouch, Cupertino, CA (US); Michael Tepper, Seattle, WA (US); Daniel Bobrow, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1138 days.

This patent is subject to a terminal disclaimer.

(21) Appl. No.: 10/999,793

(22) Filed: Nov. 30, 2004

(65) Prior Publication Data

US 2006/0116861 A1    Jun. 1, 2006

(51) Int. Cl.
G06F 17/27    (2006.01)

(52) U.S. Cl. .............. 704/9; 704/1; 704/10; 707/736; 707/767; 715/254

(58) Field of Classification Search ............ 704/9, 704/1, 10; 707/1–6, 736, 767; 715/254
See application file for complete search history.

(56) References Cited

U.S. PATENT DOCUMENTS

| | | | |
|---|---|---|---|
| 5,438,511 A | 8/1995 | Maxwell | |
| 5,689,716 A | 11/1997 | Chen | |
| 6,185,592 B1 * | 2/2001 | Boguraev et al. | 715/256 |
| 6,289,304 B1 | 9/2001 | Grefenstette | |
| 6,353,824 B1 * | 3/2002 | Boguraev et al. | 707/5 |
| 6,490,577 B1 | 12/2002 | Anwar | |
| 6,553,373 B2 * | 4/2003 | Boguraev et al. | 707/5 |
| 6,745,161 B1 * | 6/2004 | Arnold et al. | 704/7 |
| 6,944,609 B2 * | 9/2005 | Witbrock | 707/3 |
| 7,054,857 B2 | 5/2006 | Cunningham et al. | |
| 7,120,613 B2 * | 10/2006 | Murata | 706/12 |
| 7,251,781 B2 | 7/2007 | Batchilo et al. | |
| 7,310,633 B1 | 12/2007 | Wang et al. | |
| 7,346,839 B2 | 3/2008 | Acharya et al. | |
| 7,376,893 B2 * | 5/2008 | Chen et al. | 715/254 |
| 7,418,452 B2 * | 8/2008 | Maze | 707/100 |
| 7,610,190 B2 | 10/2009 | Polanyi et al. | |
| 2002/0046018 A1 * | 4/2002 | Marcu et al. | 704/9 |
| 2004/0230415 A1 | 11/2004 | Riezler et al. | |

(Continued)

OTHER PUBLICATIONS

U.S. Appl. No. 10/999,792, Kaplan et al.

(Continued)

*Primary Examiner*—David R Hudspeth
*Assistant Examiner*—Lamont M Spooner
(74) *Attorney, Agent, or Firm*—Fay Sharpe LLP

(57) ABSTRACT

Techniques are presented to determine user-interest sensitive notes. User selected passages, user interest information, condensation transformations and optional meaning distortion constraints are identified. User foci expressed by the selected passages are determined based on the similarity of the elements in the selected passages to elements in the user interest information. User sensitive notes are determined by selectively applying the condensation transformations to the selected passages to preferentially retain user foci while eliding less salient information. Meaning distortions constraints are optionally applied in conjunction with condensation transformations or in creating the condensation transformations in order to reduce the likelihood of distorting the meaning of the passage.

50 Claims, 17 Drawing Sheets

U.S. PATENT DOCUMENTS

| | | | |
|---|---|---|---|
| 2005/0108001 | A1 | 5/2005 | Aarskog |
| 2005/0137855 | A1* | 6/2005 | Maxwell, III .................. 704/9 |
| 2005/0216434 | A1 | 9/2005 | Haveliwala |
| 2006/0031043 | A1 | 2/2006 | Oral et al. |

OTHER PUBLICATIONS

U.S. Appl. No. 11/017,890, Bobrow et al.

S. Riezler et al., "Statistical Sentence Condensation Using Packing and Stochastic Disambiguation Methods for Lexical-Functional Grammar", in Proceedings of HLT-NAACL 2003, Main Papers, pp. 118-125, Edmonton, May-Jun. 2003.

R. Mitkov, "Introduction to the Special Issue on Computational Anaphora Resolution", in Computational Linguistics vol. 27, Issue 4 (Dec. 2001), pp. 473-477.

A. Frank, "From Parallel Grammar Development towards Machine Translation—A Project Overview-", In Proceedings of the MT Summit VII: MT in the Great Translation Era, 134-142, 1999.

R. Kaplan et al., "Lexical Functional Grammar: A Formal System for Grammatical Representation", in Formal Issues in Lexical-Functional Grammar ed. by M. Dalrymple, R. Kaplan, J. Maxwell and A. Zaenen, 1995.

J. Maxwell III et al., "A Method for Disjunctive Constraint Satisfaction", in Current Issues in Parsing Technology, ed. Masaru Tomita, Kluwer Academic Publishers, 1991, pp. 173-190.

U. Hahn, Automatic Text Summarization Methods, Systems, Evaluation, Text Knowledge Engineering Lab, Freiburg University, Germany, downloaded from www.coling.uni-freiburg.de/teaching/ studies/jena/ss04/introduction.ppt.

Paul and Carol Kiparsky, re-printed from "Progress in Linguistics", eds. M. Bierwisch and K. Heidolph, The Hague: Mouton, 1970.

R. Kaplan, "Three Seductions of Conceptual Psycholinguistics", in Peter Whitelock, Mary McGee Wood, Harold L. Somers, Rod Johnson, Paul Bennet (eds.), Linguistic Theory and Computer Applications p. 149-188 London: Academic Press 1987.

European Patent Office Search Report.

Hongyan J., "Sentence reduction for automatic text summarization", In Proc. of the 6th Conf. on Applied NLP, Apr. 29, 2000, pp. 310-315, Seattle, WA.

Kaplan R. et al., "A note-taking appliance for intelligence analysis", May 2, 2005, 2005 International Conference on Intelligence Analysis, McLean, VA, URL: https://analysis.mitre.org/proceedings/ Final_Papers_Files/156_Camera_Ready_Paper.pdf, retrieved on or about Jun. 22, 2006.

Crouch R., et al., "Exploiting F-Structure input for sentence condensation" In Proc. of the LFG04 Conference, Jul. 10, 2004, pp. 167-187, Christchurch, NZ.

Knight, K. et al., "Summarization beyond sentence extraction: A probabalistic approach to sentence compression", Artificial Intelligence, vol. 139, 2002, pp. 91-107.

Extended EP Search Report, Appl. No. 05112481.6-1527 / 1675025, Dated Jul. 15, 2008.

* cited by examiner

Accompanied by an armed guard, Igor Domaradsky carried a dish with a culture of genetically altered plague through the gates of the ancient fortress like a rare jewel.

FIG. 9

| { + {"Igor Domaradsky \| Igor} |
|---|
| + {disease*2} |
| + {bio-terrorism*} } |

| { {fortress*3} |
|---|
| {archaeology*} |
| {bronze age*} |
| {c:\user\abc\file_history} |
| { c:\user\abc\file_project1} |
| -{container*2} } |

| PATTERN | ACTION |
|---|---|
| -DOWNWARD_MONOTONIC(P) | CONDENSE_MODIFIERS(P) |
| PASSIVE(P), SUBJ(P,S), BY-OBJ(P,O) | SUBJ(P,O), OBJ(P,S) |

FIG. 15

| 2500 TEXT SOURCE | 2600 USER INTEREST SENSITIVE NOTES | 2700 USER INTEREST INFORMATION |
|---|---|---|
| 2510 — The earliest signs of trouble – a slight nasal stuffiness, twinges of pain in the joints, fatigue and a dry, persistent cough – resemble the onset of a cold or flu. | 2611 > The signs of trouble resemble the onset of a cold or flu. | 2610 {{+{Disease*2} — 2711 +{"Igor" | "Igor_Domaradsky"*} — 2712 +{"Bio-terrorism*"}} — 2713 |
| 2520 — Our seed stock for anthrax production was kept inside refrigerated storerooms at three productions facilities in Penza, Kurgan, and Stepnogorsk. | > It had been overseen by a biologist named Igor Domaradsky. — 2621 — 2620 | |
| 2530 — The plague weapon we had created in our laboratories, was more virulent than the bubonic plague, which killed one quarter of the population of Europe in the Middle Ages. | > Igor Domaradsky carried a culture of plague through the gates of the fortress. — 2630 / 2631 | |
| 2540 — It had been overseen by a brilliant and cantankerous molecular biologist named Igor Domaradsky, who would eventually denounce the entire Soviet biological weapons program. | | |
| 2550 — Accompanied by an armed guard, Igor Domaradsky carried a dish of culture of genetically altered plague through the gates of the ancient fortress like a rare jewel. | | |

FIG. 16

SYSTEMS AND METHODS FOR USER-INTEREST SENSITIVE NOTE-TAKING

This invention was made with Government support under MDA904-03-C-0404 awarded by ARDA. The Government has certain rights in this invention.

INCORPORATION BY REFERENCE

"Systems and Methods for User-Interest Sensitive Condensation" by Ronald KAPLAN et al., filed Nov. 30, 2004, as U.S. application Ser. No. 10/999,792; is incorporated herein by reference in the entirety.

BACKGROUND OF THE INVENTION

1. Field of Invention

This invention relates to note-taking.

2. Description of Related Art

Knowledge workers are faced with reviewing ever increasing quantities of information. Some researchers have attempted to address these problems by creating note-taking systems. These systems facilitate the review and recall of relevant material by facilitating the creation of notes useful in reminding users of relevant points.

Some of these conventional note-taking systems facilitate the recall of the information in a text by extracting, either automatically or by user specification, a significant passage from a text. However, the passage may contain quantities of information irrelevant to the user. Thus systems and methods that determine a user-interest sensitive note that provides a signal of the meaning of a passage, that is easy to read and that focuses on information of interest to the user would be useful.

SUMMARY OF THE INVENTION

The systems and methods according to this invention determine user-interest sensitive notes from a text source. The text source may include, but is not limited to a web page, an electronic book, a journal article, recognized speech and/or the like. User interest information indicating concepts of interest to the user and the language characteristics of the text are determined. A parsing grammar is selected based on the characteristics of the text and/or the language. A generation grammar and one or more optional meaning distortion constraints are also selected. A passage of at least one multi-word sentence is selected by the user. Alternate meaning structures of the passage are determined based on the parsing grammar.

The alternate meaning structures include multiple enumerated readings of meaning associated with a sentence, a single meaning representation indicative of all readings of the sentence, a single representation that allows common elements between readings to be shared and the like. Elements within the alternate meaning structures that are conceptually similar to the concepts expressed in the user interest information are identified as foci of user interest. Condensation transformations that optionally incorporate meaning distortion constraints are selectively applied to the alternate meaning structures to create reduced meaning structures. The condensation transformations prioritize the retention of user interest foci within the alternate meaning structures, condense, delete, merge and otherwise transform the alternate meaning structures and optionally decrease the likelihood of distorting the meaning of a passage. The meaning distortion constraints include, but are not limited to ensuring the meaning of a condensed passage is plausibly inferred, entailed, and or implied from the source passage. The meaning distortion constraints may be applied during the construction of a condensation transformation or after a condensation transformation has been applied, either alone or in combination, to repair any distortions of meaning created in the reduced meaning structure.

Candidate condensates are optionally determined from the alternate reduced meaning structures based on a model of statistical disambiguation. A generation grammar is applied to the reduced meaning structures to determine one or more candidate condensed condensates. The condensates are optionally ranked to form a list of the N-best condensates. The candidate condensates represent a user-interest focused signal of the meaning associated with the selected passage. The generation grammar may include, but is not limited to a generation grammar that produces grammatical sentences and may be the same or different from the parsing grammar.

A manually and/or automatically selected condensate is optionally associated with the passage. The user-interest focused condensate and optional associated passage form a user-interest sensitive note. The user-interest sensitive note is then output. Output of the user-interest sensitive note includes, but is not limited to, saving the user-interest sensitive note to an information repository or file, displaying the user-interest sensitive note on a display device, sending the user-interface sensitive note to a computer program for processing and the like. In viewing the user-interest sensitive note, all or portions of the user-sensitive note are associated with selectable user-interface components operable to expand, contract and otherwise affect the display of the condensate and passage portions. The condensate and passage portions of the user-interest sensitive note may be displayed using pop-ups boxes, text balloons, resized/zooming window elements or any known or later developed user interface element useful in the display of a condensate and associated passage information.

BRIEF DESCRIPTION OF THE DRAWINGS

FIG. 9 is an exemplary passage to be noted according to this invention;

FIG. 10 is a first exemplary data structure for storing user interest information according to this invention;

FIG. 14 is a second exemplary data structure for storing user interest information according to this invention;

FIG. 15 is an exemplary data structure for meaning distortion constraints according to this invention;

FIG. 16 is a view of a user interface for an exemplary user-interest sensitive note-taking system according to a first aspect of this invention.

DETAILED DESCRIPTION OF EXEMPLARY EMBODIMENTS

Figure 1:
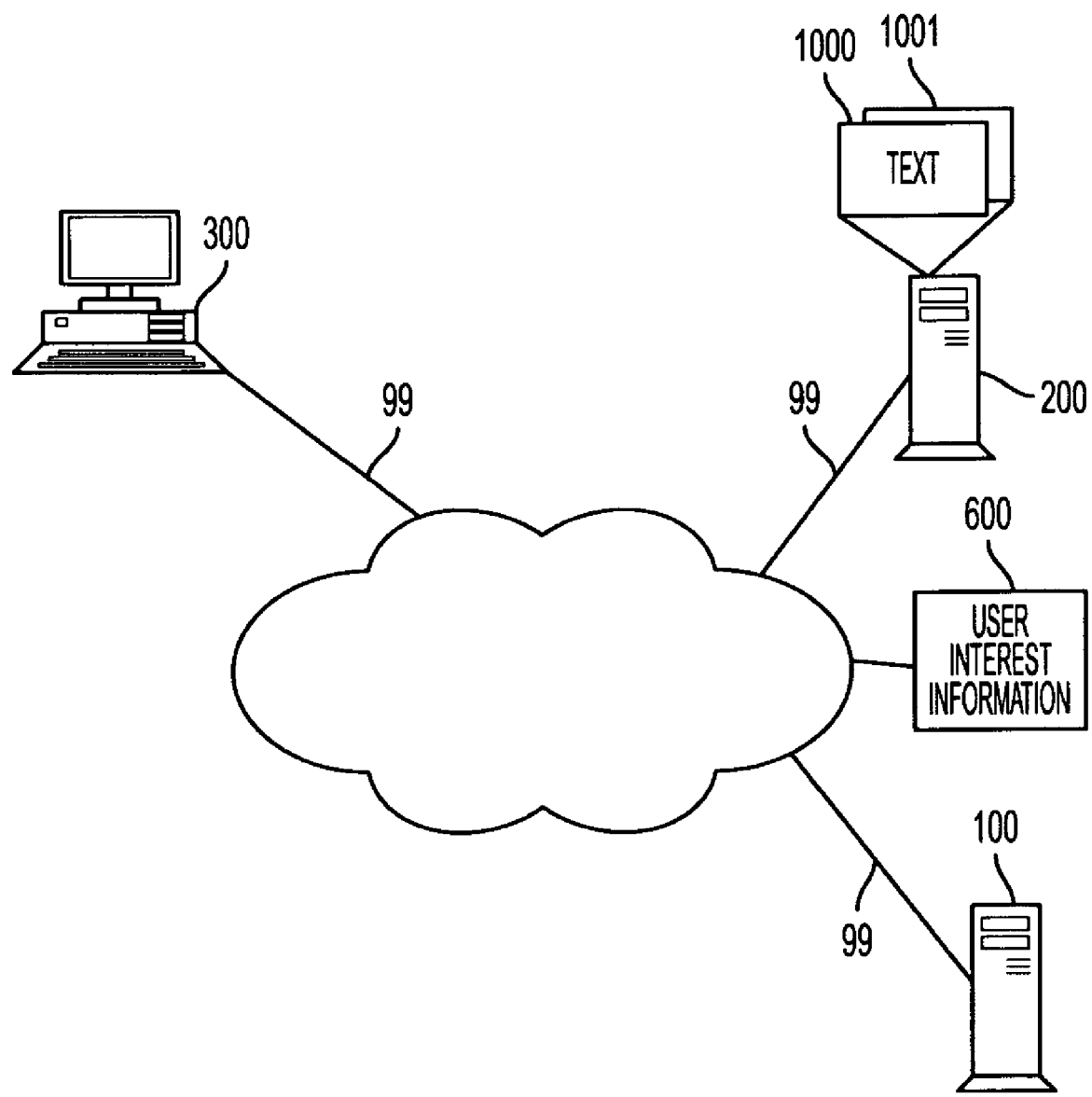
FIG. 1 is an overview of an exemplary user-interest sensitive note taking system according to this invention.

FIG. 1 is an overview of an exemplary user-interest sensitive note taking system 100 according to this invention. An information repository 200 provides access to texts 1000-1001; a communications-enabled personal computer 300; and a user interest information repository 600; are each connectable to the user-interest sensitive note taking system 100 over communications links 99.

The information repository 200 may include a web server serving files encoded in HTML, XML, and/or WML, a digital library providing access to Microsoft Word® and/or Adobe PDF® documents, or any other known or later developed method of providing access to texts 1000-1001.

In one exemplary embodiment according to this invention, a user of the communications-enabled personal computer 300 highlights a passage of one or more multi-word sentences within the text 1000 retrieved from information repository 200. The communications enabled personal computer 300 initiates a request to determine a user-interest sensitive note for the selected passage of text. The user-interest sensitive note taking system 100 acts as a proxy by receiving the user request and the selected passage and retrieving the user interest information from the user interest repository 600. The user-interest sensitive note taking system 100 retrieves a parsing grammar to determine alternate meaning structures associated with the passage. Meaning distortion constraints are optionally determined and applied to prevent and/or to repair meaning distortions created by the condensation transformations. The meaning distortion constraints may be applied during the construction of a condensation transformation and/or after a condensation transformation has been applied, to repair meaning distortions that were created.

Condensation transformations are applied to the alternate meaning structures based on the user interest information and the optional meaning distortion constraints. The condensation transformations delete, merge and/or adjust the elements of the alternate meaning structures while ensuring that concepts of interest to the user are preserved in the resultant reduced alternate meaning structures. The elements of the user interest information are compared to the elements of the alternate meaning structures. For example, if the user interest information contains the term "plague", then elements in the alternate meaning structures conceptually related to "plague" are identified as foci of user interest. It will be apparent that elements in the alternate meaning structures can be compared based on conceptual similarity, synonym, hyponym, hypernym, statistical, distributional and various other types of similarity.

For example, a measure of distributional-similarity over a large document base, such as the web may be used as a measure of similarity. Two words are distribution-similar to the extent that they tend to co-occur in the same sentences or documents with some set of other words. (E.g. cancer and melanoma are distribution-similar because they co-occur with words like "treatment", "radiation" and the like.

In other exemplary embodiments according to this invention, the elements in the alternate meaning structures are semantic facts. A semantic fact is a simple proposition that a particular predicate is asserted to apply to a particular set of arguments or entities. Thus, the phrase "John saw Bill" encodes the semantic fact "see (John,Bill)". The phrase "Sam realized that John saw Bill", covers two semantic facts: 1) realize (Sam, P) where P is the proposition; and 2) see (John, Bill).

Semantic facts in the alternate meaning structures matching corresponding elements in the user interest information are marked. The marked elements indicate semantic facts of greater interest and higher priority that should be retained. Condensation transformations are applied to the facts of the alternate meaning structures based on a strategy that retains marked facts and optionally elides un-marked facts.

The condensing transformations are applied to delete, merge, transform or otherwise condense facts in the alternate meaning structures to create condensed alternate meaning structures. The condensation transformations prioritize the retention of user interest foci in the condensed alternate text structures based on the similarity of facts in the alternate meaning structures and the user interest information. In various exemplary embodiments, the condensation transformations include optional meaning distortion constraints. The meaning distortion constraints reduce the likelihood of generating condensed alternate meaning structures that distort the meaning of the passage. The user interest information increases the likelihood that concepts of interest to the user and that are expressed in the passage are also retained in the condensed alternate meaning structures.

Candidate structures are determined based on a disambiguation model. For example, in various exemplary embodiments according to this invention, a stochastic disambiguation model and/or a predictive model indicative of appropriate candidate structures of the selected language is determined. The stochastic or predictive model may be trained to assign higher probabilities to better examples in its training set and lower probabilities to less desirable or less appropriate examples. Thus, the probability serves as a surrogate for the desirable features identified in the training set. The stochastic or predictive model is then applied to the condensed alternate meaning structures to select likely candidate structures. It should be noted that the resultant candidate structures do not necessarily correspond to English language sentences.

A generation grammar is applied to the candidate structures to determine candidate condensates. After generation, the candidate condensates corresponding to sentences are optionally ranked. For example, the percentage sentence reduction length is optionally combined with the ranking of candidates obtained from the stochastic or predictive model. The user selects one of the ranked candidate condensates as a user-interest sensitive indication of the meaning of the passage. The user-interest sensitive note is determined by optionally associating the selected condensate with all or a portion of the selected passage. Dynamically selectable user interface elements are associated with expansion, compression and/or display of the condensate, the passage and/or other portions of the user-interest sensitive note. It will be apparent that in other exemplary embodiments according to this invention, the number of N-best candidates is adjustable. Thus, if N=1 is selected, the most desirable condensate may be selected automatically without requiring the user to select among additional candidate condensates. The user may optionally edit the automatically and/or manually selected condensate either immediately after the selection and/or at a later time.

Figure 2:
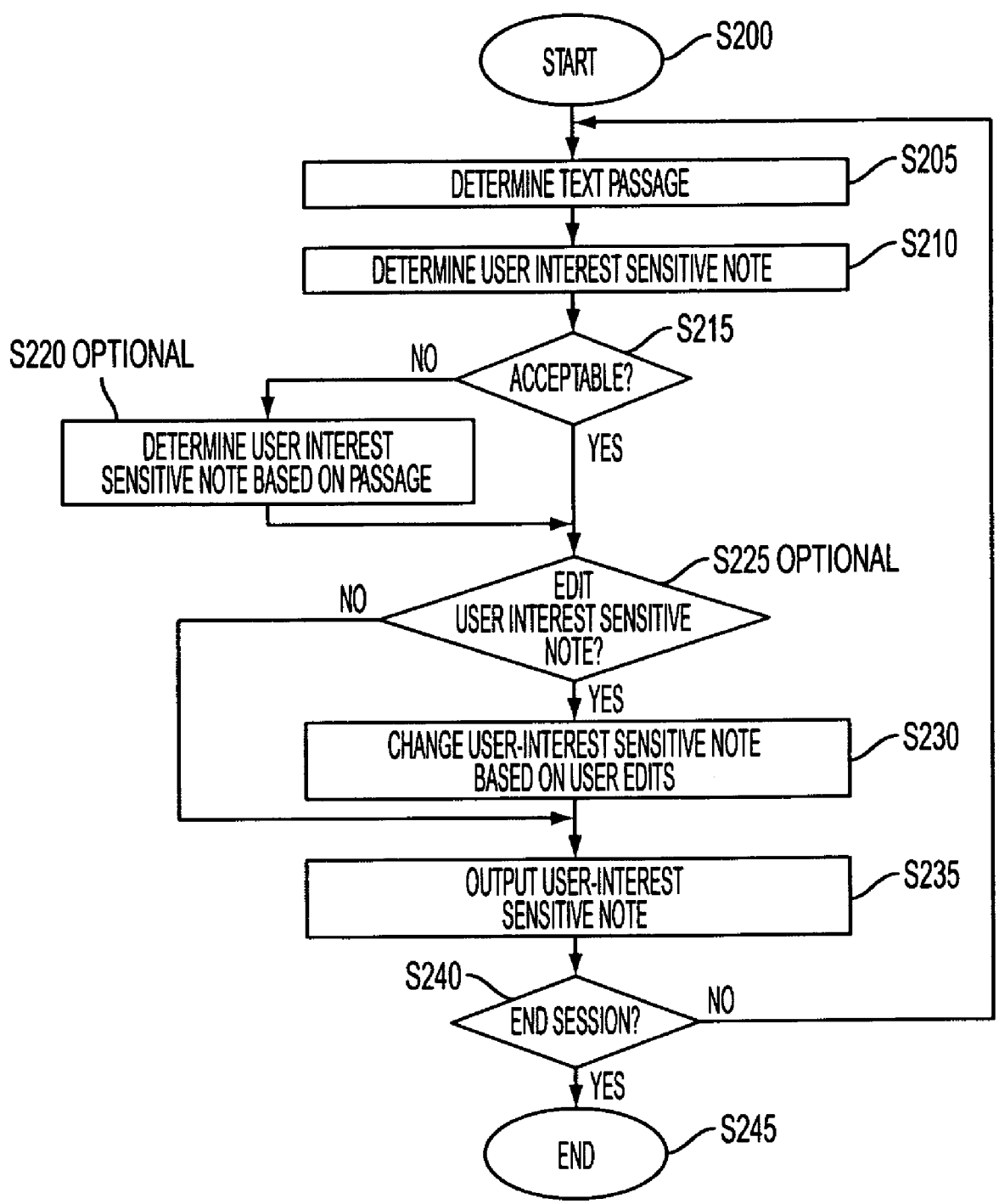
FIG. 2 is a flowchart of the use of an exemplary user-interest sensitive note taking system according to one aspect of this invention.

The FIG. 2 is a flowchart of the use of an exemplary user-interest sensitive note-taking system according to one aspect of this invention. The process begins at step S200 and immediately continues to step S205. In step S205, a passage of text to be noted is determined. The passage is selected using highlighting, tagging, and/or any known or later developed method of selecting a text passage. After the passage to be noted is determined, control continues to step S210.

In step S210, a user interest sensitive note is determined for the selected passage. A meaning structure associated with the meaning of the passage is optionally determined. User interest information is determined. User foci within the passage and/or optional meaning structure are determined based on the similarity between user interest elements and the elements of the passage and/or meaning structure. Condensations transformations are selectively applied to the passage and/or meaning structure to compress, elide and or otherwise condense the passage to a reduced passage and/or meaning structure. The user foci within the passage and/or meaning structure are preferentially retained over other elements less germane to the user's interest.

A condensate is determined based on the reduced passage and/or meaning structure. A user-interest sensitive note is formed from the condensate and the optionally associated passage. The condensate provides a user-interest focused signal of the meaning available for further review on expansion of the dynamically selectable user-interest sensitive note. After the user-interest sensitive note has been determined, control continues to step S215.

In step S215, a determination is made as to whether the user-interest sensitive note is acceptable. The acceptance may be implicit and/or explicit. In various embodiments according to this invention, the user-interest sensitive note is accepted by default. For example, unless the user indicates a specific rejection, the user-interest sensitive note is deemed accepted. In other exemplary embodiments, unless the user explicitly accepts the user-interest sensitive note, the note is deemed rejected. If the user indicates either an implicit or explicit rejection of the user-interest sensitive note, control continues to optional step S220.

In optional step S220, a new user interest sensitive note is determined based on the passage portion. For example, if the programmatically generated condensate portion of the user-interest sensitive note does not meet the user's needs, the original passage is made available to the user for insertion as the new condensate portion of the user-interest sensitive note. If the progamatically generated condensate is unacceptable, the full meaning of the passage is easily retained by inserting the passage into the user-interest sensitive note.

It will be apparent that in still other embodiments, the passage may be automatically inserted if no user-interest sensitive note is selected as acceptable in step S215. This reduces the cognitive load on the user by providing an intuitive, fail-soft behavior which preserves meaning by default. After the user-interest sensitive note has been accepted, control continues to step S225.

In step S225, a determination is made as to whether the user-interest sensitive note is to be edited by the user. For example, the user may wish to edit the user-interest sensitive note to refine the condensate portion, produce a manually modified form of the optional passage portion, highlight, underline and/or otherwise indicate emphasis and the like. If it is determined that no edits are required, control immediately jumps to step S235.

Otherwise, edits of the user-interest sensitive note are required and control continues to step S230. The interest sensitive note is then changed based on the user edits. For example, the user may add and/or remove terms from the condensate and/or optional passage portion of the note. User edits or changes may increase the utility of the condensate portion as a signal of the user-focused meaning of the passage.

In various embodiments, changes to the user-interest sensitive note are optionally and/or automatically used to adjust the user interest information. It will be apparent that user-interest sensitive notes may be determined from any type of passage, including but not limited to, previously determined user-interest sensitive notes. If a user-interest sensitive note is selected as a passage, a different user-interest sensitive note may be determined if new user interest information has been added since the note was first created. After the user-interest sensitive note has been changed based on the user edits, control continues to step S235.

In step S235, the user-interest sensitive note is output. The output may include saving the user-interest sensitive note in a file and/or a storage device, displaying the user-interest sensitive note on a video monitor and/or display device and the like. After the user-interest sensitive note has been output, control continues to step S240.

In step S240, a determination is made as to whether a termination of the current note-taking session has been initiated and/or requested. Termination may be initiated with a key sequence, by shutting down the machine, exceeding a timer and the like. If no end-of-session is determined, control continues to step S205 and steps S205-S240 are repeated. When it is determined in step S240 that the session has ended, control continues to step S245 and the process ends.

Figure 3:
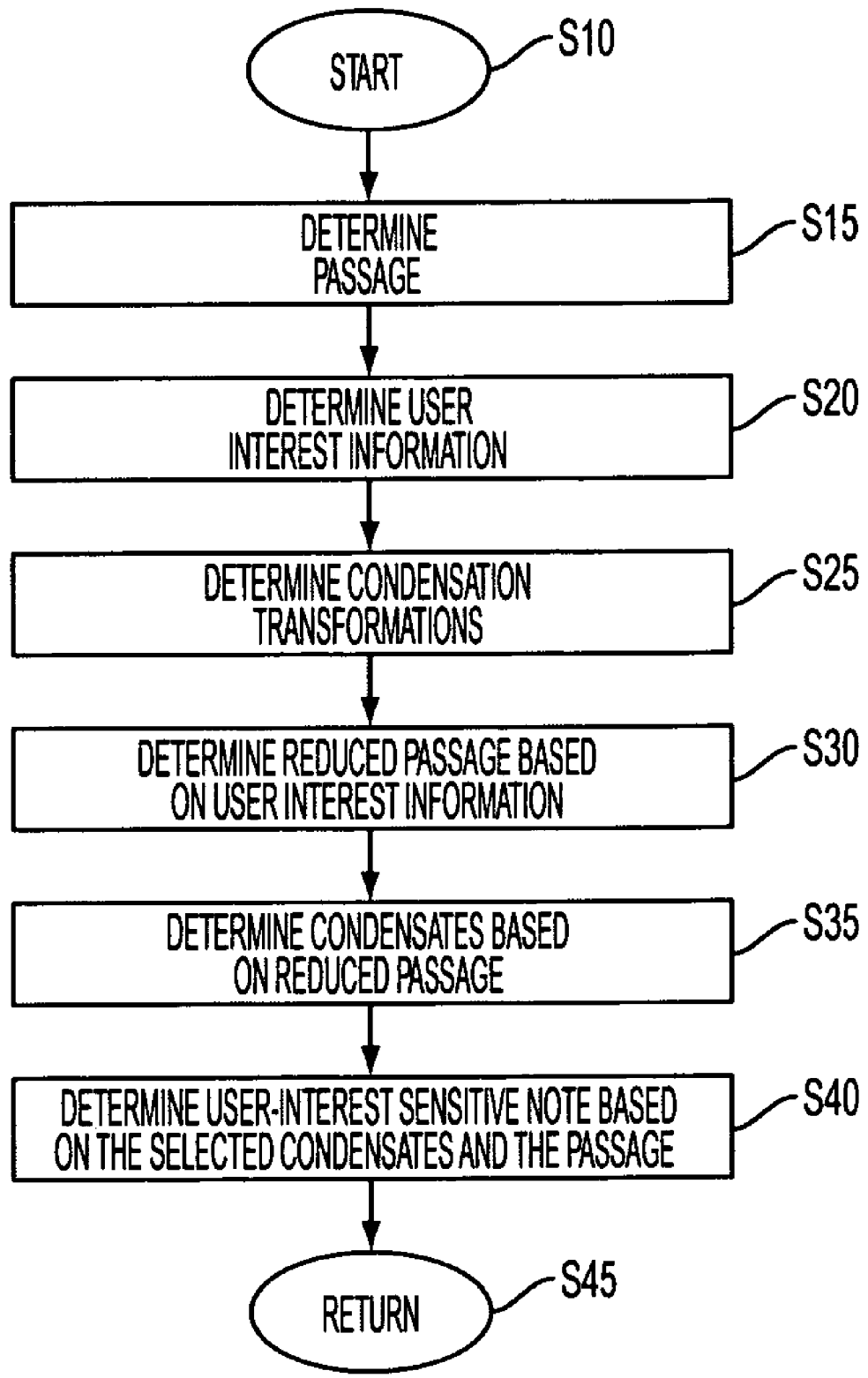
FIG. 3 is a flowchart of a first exemplary method for creating user-interest sensitive notes according to this invention.

FIG. 3 is a flowchart of a first exemplary method of creating user-interest sensitive notes according to this invention. The process begins at step S10 and immediately continues to step S15.

In step S15, a passage to be condensed by user-sensitive notes is selected. The passage to be noted is read from a file, an information repository such as a web server, recognized using an automatic speech recognition system and/or determined using any known or later developed selection and/or input method. The passage may augmented by non-local information from phrases that are co-referent with elements of the passage. Methods for determining co-reference of phrases in a passage are described in "Special Issue on Computational Anaphora Resolution", vol. 27, No. 4, Journal of Computational Linguistics, 2001. After the passage has been input and/or determined, control continues to step S20 where user interest information is determined. After the user interest information has been determined, control continues to step S25.

In step S25, the condensation transformations are determined. The condensation transformations reduce the selected passage by merging, deleting and/or changing elements. In various exemplary embodiments, the condensation transformations are expressed as rewrite rules or functions in the Xerox Linguistic Environment (XLE). However, various other linguistic tools, functions and/or environments can also be used to create a condensation transformation without departing from the scope of this invention. After the condensation transformations have been determined, control continues to step S30.

In step S30, a reduced passage is determined based on the user interest information and the condensation transformations. The condensation transformations are selectively applied to remove modifiers and other less salient information from the passage based on the identified user interest information. After the reduced passage is determined, control continues to step S35.

In step S35, one or more candidate condensates are determined based on the reduced passage. The candidate condensates indicate a user focused representation of the meaning of the passage. The candidate condensates are optionally ranked for selection based on stochastic and/or predictive model. After the candidate condensates have been determined, control continues to step S40.

In step S40, a user-interest sensitive note is determined based on one of the condensates and the passage. The user-interest sensitive note optionally associates the condensate and the passage. The selected condensates serve as headers, as anchor for fluid expansions of associated portions of the user-interest sensitive note and the like. The condensates provide a user-interest focused signal of the information available for further review in expansions of the optionally associated passage and/or other portions of the user-interest sensitive note.

The condensate, the passage and/or other portions of the user-interest sensitive note are selectively display-able based on user actions. For example, a click on the condensate portion of the user interest sensitive note optionally displays the associated passage portion. After the user-interest sensitive note has been determined, control continues to step S45, the process returns to step S210 of FIG. 2. Control then immediately continues to step S215.

Figure 4:
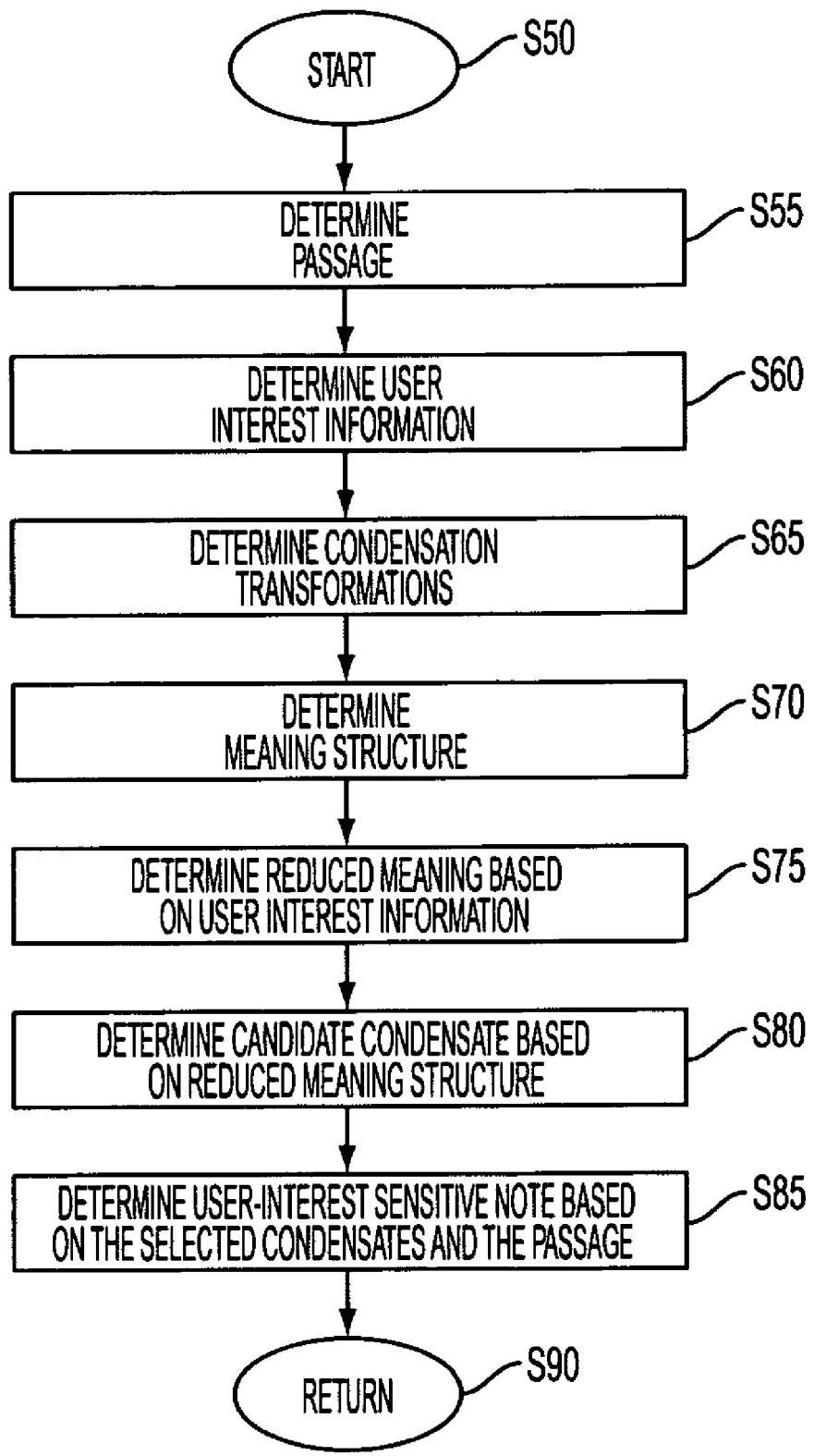
FIG. 4 is a flowchart of a second exemplary method for creating user-interest sensitive notes according to this invention.

FIG. 4 is a flowchart of a second exemplary method of creating user-interest sensitive notes according to this invention. The process begins at step S50 and immediately continues to step S55.

In step S55, a passage to be condensed by user-sensitive notes is selected. The passage to be noted is read from a file, an information repository such as a web server, recognized using an automatic speech recognition system and/or determined using any known or later developed selection and/or input method. After the passage has been input and/or determined, control continues to step S60 where user interest information is determined.

In various exemplary embodiments according to this invention, the user interest information is read from a file based on a user identifier or interactively entered by a user. However, it will be apparent that various other known or later developed input methods can be used in the practice of this invention. After the user interest information has been determined, control continues to step S65.

In step S65, the condensation transformations are determined. The condensation transformations reduce the size of the selected passage by merging, deleting and/or changing elements. In various exemplary embodiments, the condensation transformations are expressed as rewrite rules or functions in the Xerox Linguistic Environment (XLE). However, various linguistic tools, functions and/or environments can also be used to create a condensation transformation without departing from the scope of this invention. After the condensation transformations have been determined, control continues to step S70.

In step S70, a meaning structure is determined. The meaning structure is determined using a grammar that parses the passage into a meaning structure. The meaning structure may include but is not limited to, a f-structure of the Lexical Functional Grammar, a head-driven phrase structure grammar and the like. After the meaning structure has been determined, control continues to step S75.

In step S75, a reduced meaning structure is determined based on the user interest information and the condensation transformations. The condensation transformations are selectively applied to remove modifiers and other less salient information from the meaning structure based on the identified user interest information. After the reduced meaning structure is determined, control continues to step S80.

In step S80, one or more candidate condensates are determined based on the reduced meaning structure. The candidate condensates indicate a user focused representation of the meaning of the passage. The candidate condensates are optionally ranked for selection based on stochastic and/or predictive model. After the candidate condensates have been determined, control continues to step S85.

In step S85, a user-interest sensitive note is determined based on one of the condensates and the passage. The user-interest sensitive note optionally associates the condensate and the passage. In various exemplary embodiments, the selected condensates may serve as headers and/or bullets in a user note file, as anchor points for fluid expansions of associated portions of the user-interest sensitive note and the like. In one embodiment, the condensates provide a user-interest focused signal of the information available for further review in expansions of the optionally associated passage and/or other portions of the user-interest sensitive note.

The condensate, the passage and/or other portions of the user-interest sensitive note are selectively display-able based on user actions. For example, a click on the condensate portion of the user interest sensitive note optionally displays the associated passage portion. After the user-interest sensitive note has been determined, control continues to step S90, the process returns to step S210 of FIG. 2. Control then immediately continues to step S215.

Figure 5:
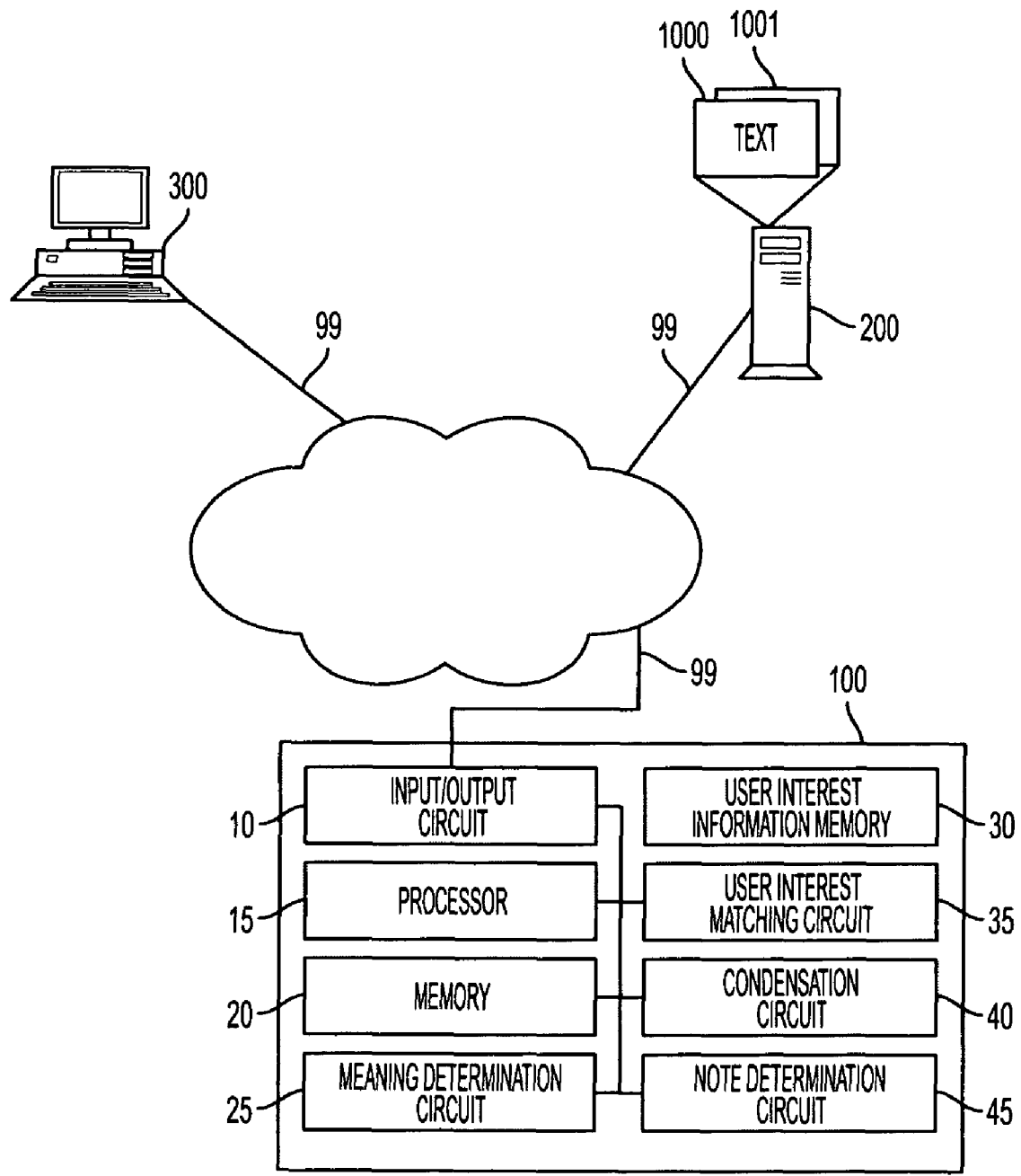
FIG. 5 is a first exemplary user-interest sensitive note taking system according to this invention.

FIG. 5 is a first exemplary user-interest sensitive note taking system 100 according to this invention. The first exemplary user-interest sensitive note taking system 100 comprises a processor 15; a memory 20; a meaning determination circuit 25; a user interest information memory 30; a user interest matching circuit 35; a condensation circuit 40; and a note determination circuit 45; each connected to input/output circuit 10 and via communications link 99 to a communications-enabled personal computer 300; and an information repository 200.

A user of the communications-enabled personal computer 300 initiates a request for the dynamic determination of a user-interest sensitive note for a passage of text 1000. The input/output circuit 10 of the user-interest sensitive note taking system 100 receives the request and the selected passage, and retrieves the passage 1000 over communications links 99 from the information repository 200.

The processor 15 retrieves the user interest information from the user interest information memory 30. The user interest information indicates the concepts of interest to the user. The user interest information is expressed using one or more terms or keywords, synonyms, hypernyms, hyponyms and/or any known or later developed method of describing and/or defining concepts of interest to the user. The processor 15 activates the meaning determination circuit 25 to determine alternate meaning structures for the passage.

The processor 15 activates the user interest matching circuit 35. The user interest matching circuit 35 determines user interest foci within the alternate meaning structures of the passage. The user interest foci are elements of the alternate meaning structures that are similar to elements of the user interest information. The user interest foci reflect the information content of the passage of greatest interest to the user.

The processor 15 retrieves previously stored condensation transformations from memory 20. Although various embodiments describe retrieving the condensation transformations from memory, it will be apparent that the condensation transformations may be retrieved from any location accessible via communications link 99 without departing from the scope of this invention.

The processor then activates the condensation circuit 40 to condense the meaning of the passage to one or more condensates. The condensation circuit 40 applies the condensation transformations to reduce the size of the alternate meaning structures by merging, deleting and/or changing elements. The condensation transformations are expressed as rewrite rules or functions in the Xerox Linguistic Environment (XLE). However, various linguistic tools, functions and/or environments can also be used to create a condensation transformation without departing from the scope of this invention. The condensation circuit 40 determines reduced meaning structures based on a strategy that increases the likelihood of retaining the interest foci in the resultant reduced meaning structures. Candidate condensates are then determined. The processor 15 optionally ranks the candidate condensates in a pick list or the like.

The note determination circuit 45 is then activated to determine the N-best candidate condensates for output to the user of the communication-enabled personal computer 300. The candidate condensates optionally include the passage as a selection in the list of ranked candidate condensates. Thus, if it is determined that none of the condensed condensates are acceptable to the user, the passage is inserted into the note file to provide a fail-soft behavior that preserves the original meaning. The condensate and the associated passage form a user-interest sensitive note. Selectable user interface elements are associated with the user-interest sensitive note. The dynamic and selectable user interface elements are operable to expand/compress and/or otherwise transform the display of, all or portions of the user-interest sensitive note.

For example, in one exemplary embodiment of a user-interest sensitive note-file, the condensate of a user-interest sensitive note is displayed. The condensate provides a user-interest focused signal of the meaning of the associated passage. A user initiated action such as selecting a link associated with the condensate operates to initiate a display action with the note. In various embodiments, the display action includes, but is not limited to, displaying the associated passage in a pop-up window, expanding the passage below the condensate, and/or otherwise dynamically changing the user-interest sensitive note. It should be apparent that the user-interest sensitive notes including the condensates and any associated passages, can be output to a file, a computer clipboard, an application program, a display and/or any known or later developed output, storage and/or display device without departing from the scope of this invention.

Figure 6:
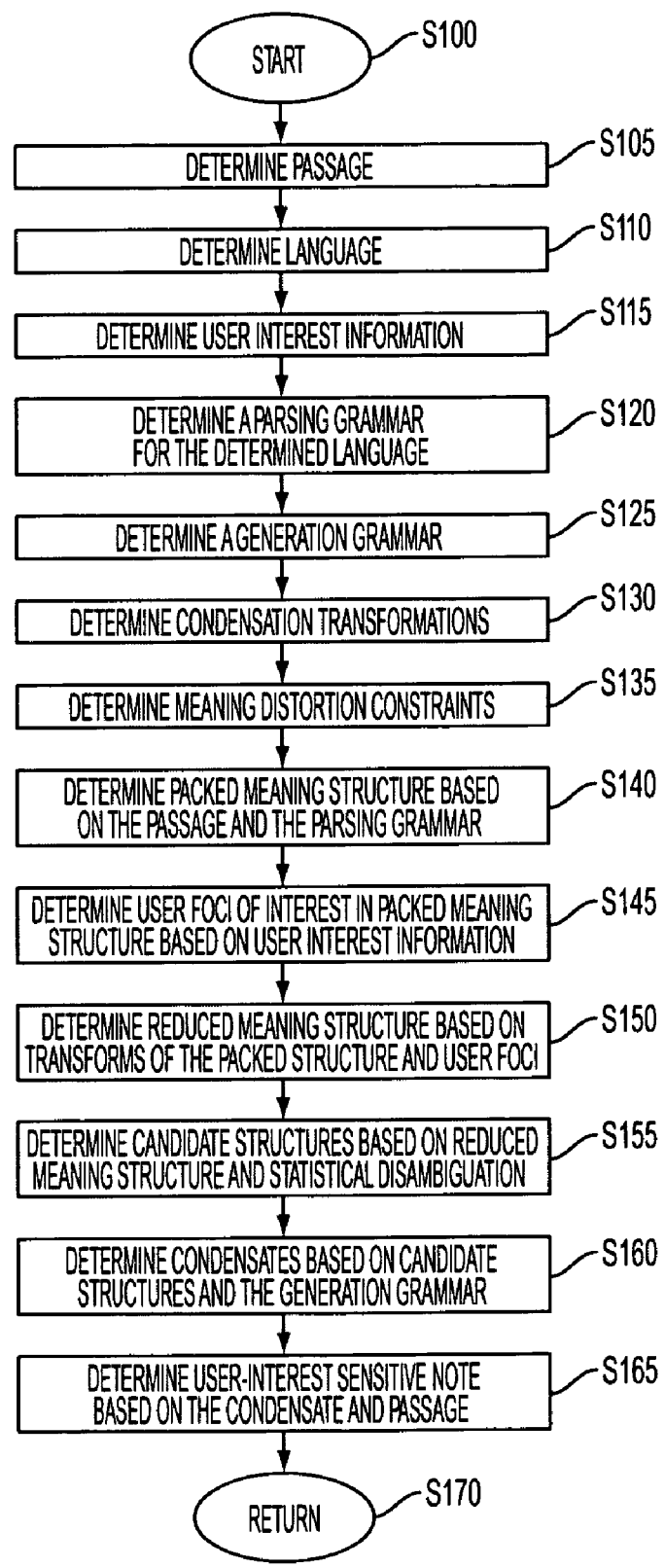
FIG. 6 is a flowchart of a third exemplary method for creating user-interest sensitive notes according to this invention.

FIG. 6 is a flowchart of a third second exemplary method for creating user-interest sensitive notes according to this invention. The process begins at step S100 and immediately continues to step S105 where the passage to be noted is determined.

In step S105, the passage of text to be noted is determined. The text passage is one or more multi-word sentences highlighted, pasted, marked and/or selected by the user. After the passage is selected, control continues to step S10 where the language characteristic associated with the passage is optionally determined.

In various exemplary embodiments of this invention, the language characteristic associated with the passage is determined using XML and/or HTML language identification tags, linguistic analysis of the passage and/or any known or later developed method of determining language. After the language characteristic of the passage is determined, control continues to step S115.

In step S115, the user interest information is determined. The user interest information includes but is not limited to one or more explicit and/or non-explicit conceptual expressions of interest to the user. For example, in one exemplary embodiment, explicit user information is captured in the form of keywords from a dialog box or other input element. A lexicon such as WordNet may be used to create sets of concept terms such as synonyms, hyponyms, hypernyms and instances that are related to explicit terms of interest. The input keyword and related concepts reflect the information of interest to the user.

In other exemplary embodiments according to this invention, the user interest is determined from indirect and/or non-explicit expressions of user interest. For example, user interest is optionally determined from inferences drawn from user browsing patterns within libraries and/or data repositories. In still other embodiments, a user's curriculum vitae, academic course listings, academic and or professional degree programs, professional specialty, hobbies and/or various other user-related information is used to determine the user interest information. After the user interest information is determined, control continues to step S120.

In step S120, a parsing grammar is determined. The parsing grammar is determined based on the determined language characteristic, the genre of the selected text and/or any known or later developed characteristic of the passage or the text from which it is selected. Any one or combination of a lexical functional grammar, a head-driven phrase structure grammar, a lexicalized tree adjoining grammar, a combinatory categorial grammar or any known or later developed grammar useful in parsing a passage into a meaning structure may be used in the practice of this invention.

In one exemplary embodiment, a first parsing grammar based on the "English" language and "newspaper" genre characteristics of the passage is selected. A second parsing grammar, based on the "English" language and "scientific publication" genre characteristics is selected to parse English language "Bio-Engineering" articles. In this way, a parsing grammar is selected that recognizes language structures associated with each text and/or passage. The parsing grammar may be a previously determined generic grammar, a grammar based on the text and/or specific properties of the text. After the parsing grammar is determined, control continues to step S125.

The generation grammar is determined in step S1125. The generation grammar ensures the condensates conform to the grammar of the selected language. The generation grammar may be the same as the parsing grammar. For example, any one or combination of a lexical functional grammar, a head-driven phrase structure grammar, a lexicalized tree adjoining grammar, a combinatory categorial grammar or any known or later developed grammar useful in generating sentences that express the information in a meaning representation may be used in the practice of this invention.

In various embodiments according to this invention, a version of a lexical functional grammar is used as a generation grammar. To the extent that the lexical function grammar accurately models the properties of a natural language such as English, the output produced will be grammatical. A version of the lexical function grammar is used to generate these grammatical condensed sentences. However, it should be apparent that any known or later developed grammar may be used for both the parsing and generation portions of this invention. After the generation grammar is determined, control continues to step S130.

In step S130, the condensations transformations are determined. The condensation transformations delete, merge and/or change elements of the alternate meaning structures. The condensation transformations use re-write rules, and/or any other known or later developed method of transforming a meaning structure. After the condensation transformations have been determined, control continues to step S135.

In step S135, the meaning distortion constraints are determined. The meaning distortion constraints are optionally applied to each condensation transform. The meaning distortion constraints ensure that the condensation transformations applied to the passage do not distort the meaning of the passage. For example, the passage, "The CEO believes that $4^{th}$ quarter earnings will improve." might be condensed to "The $4^{th}$ quarter earnings will improve.". However, the value of the resultant condensate is limited since it distorts the meaning of the passage: the passage expresses only a belief, not a fact. By applying the optional meaning distortion constraints in conjunction with, and/or in the formulation of the condensation transformations, the condensates that distort the meaning of the associated passage are less likely to be generated and/or are discarded from consideration. After the optional meaning distortion constraints have been determined, control continues to step S140.

In step S140, a packed meaning structure of alternate meanings is determined based on the passage and the parsing grammar. In one exemplary embodiment according to this invention, the packed f-structure meaning representation of the Xerox Linguistic Environment (XLE) is used as the packed meaning structure. The XLE f-structures are discussed further in U.S. patent application Ser. No. 10/435,036, by Riezler et al, filed May 12, 2003; and in "Statistical Sentence Condensation using Ambiguity Packing and Stochastic Disambiguation Methods for Lexical Functional Grammar", by Riezler et al, published in the Proceedings of HLT-NAACL 2003, Main Papers, pp. 118-125, Edmonton, Alberta, Canada May-June 2003, each, herein incorporated by reference in their entirety. However, it should be apparent that various other meaning representations may also be used without departing from the scope of this invention.

The packed f-structure representation of the Xerox XLE environment efficiently encodes natural language ambiguity by determining a list of contexted facts for a text passage. The contexted facts are of the form Ci→Fi, where Ci is a context and Fi is a linguistic fact. The context is typically a set of choices drawn from an and-or forest that represents the ambiguity of the passage or sentence. Each fact in the packed f-structure representation of the Xerox XLE environment occurs only once in the structure even though it may be part of several of the alternate meanings that the packed structure represents. This normalization of facts facilitates finding and transforming elements.

For example, natural language ambiguity may result in multiple possible meanings represented by a specific packed f-structure. In the Xerox XLE environment, the packed f-structure encodes the multiple meanings but does not require duplicating the elements common to several meanings. For example, the phrase, "the duck is ready to eat" has 2 meanings. The duck is hungry or the duck is cooked. However, the packed f-structure representation of the Xerox XLE allows the two meanings to share the "the duck", as a common substructure. Thus, the time necessary to operate on the information contained in a packed f-structure meaning structure is decreased. Disjunctive unification and packed f-structures are discussed further in U.S. Pat. No. 5,438,511, herein incorporated by reference in its entirety. After the packed meaning structure is determined, control continues to step S145.

In step S145, the user foci in the packed structure are determined based on the user interest information. The user foci are elements in the packed meaning structure that match or are similar to corresponding elements in the user interest information. Thus, in one exemplary embodiment, elements in the user interest information are matched against corresponding elements of the packed meaning structure to determine user foci. The matching elements in the packed meaning structure are then marked as user foci of interest. The matching occurs based on literal, conceptual, and/or statistical similarity between the concepts expressed in the user interest information and the concepts expressed in the packed meaning structure. After the user foci of interest have been determined, control continues to step S150.

In step S150, a reduced meaning structure of the packed meaning structure is determined based on the user foci of interest, meaning distortion constraints and the transformations. The condensation transformations applied to the elements of the packed meaning structure may include, but are not limited to deleting less salient elements, substituting shorter or more compact elements and/or changing elements. The condensation transformations are constrained to preserve or prioritize the user foci of interest and avoid distorting the meaning of the passage. For example, in various exemplary embodiments according to this invention, facts encoded in the packed f-structure meaning representation of the Xerox XLE are transformed based on the condensation transformations. The condensation transformations encode actions or procedures that reduce the occurrence of less salient and/or less relevant information in the exemplary packed structural representation by adding, deleting or changing facts. The resultant reduced structure associated with the transformed facts represents an efficient encoding of each possible condensed meaning structure. After the reduced structure is determined, control continues to step S155.

In step S155, the most likely candidate structures are determined from the reduced structure based on a stochastic disambiguation model. The candidate structures are determined using stochastic, lexical semantic and/or any known or later developed disambiguation method. For example, in one of the exemplary embodiments according to this invention, a statistical analysis of exemplary reduced structures is used to determine a maximum likelihood disambiguation model.

A predictive disambiguation model is then used to determine the most likely reduced meaning structures from the reduced meaning structure based on property functions such as: attributes; attribute combinations; attribute value-pairs; co-occurrences of verb-stems; sub-categorization frames; rule trace information and/or any known or later developed features of the meaning structures. For example, in various exemplary embodiments according to this invention, a set of possible candidate structures S(y) for each sentence y in training data $\{(s_j, y_j)\}_{j=1}^{m}$ is determined. The predictive disambiguation model is trained based on the conditional likelihood L(λ) of a reduced meaning structure for each given sentence based on the formula:

$$L(\lambda) = \log \prod_{j=1}^{m} \frac{e^{\lambda \cdot f(s_j)}}{\sum_{s \in S(y_j)} e^{\lambda \cdot f(s)}} \quad (1)$$

where f are property functions and y and s are original sentence to gold-standard reduced meaning structure pairs. Candidate structures are then determined based on the predictive disambiguation model and the reduced meaning structure. The candidate structures are a subset of the full set of reduced meaning structures based on a threshold on their probabilities as determined by the stochastic disambiguation model. After the most likely candidate structures are determined, control continues to step S160.

The condensates are determined in step S160. For example, in one embodiment, a generation grammar is used in conjunction with the most likely candidate structures to determine one or more well formed sentences usable as condensates representative of the meaning of the passage. In various exemplary embodiments, a pick list of the N-best structures is output to allow the user to quickly select an alternate condensation as a user-interest focused signal of the meaning of the passage. It will be apparent however that any method of presenting likely candidate condensates can be used in the practice of this invention. After the candidate condensates have been determined, control continues to step S165. The user-interest sensitive note is determined based on the condensate and the optionally associated passage. Control then continues to step S170 and the process ends.

Figure 7:
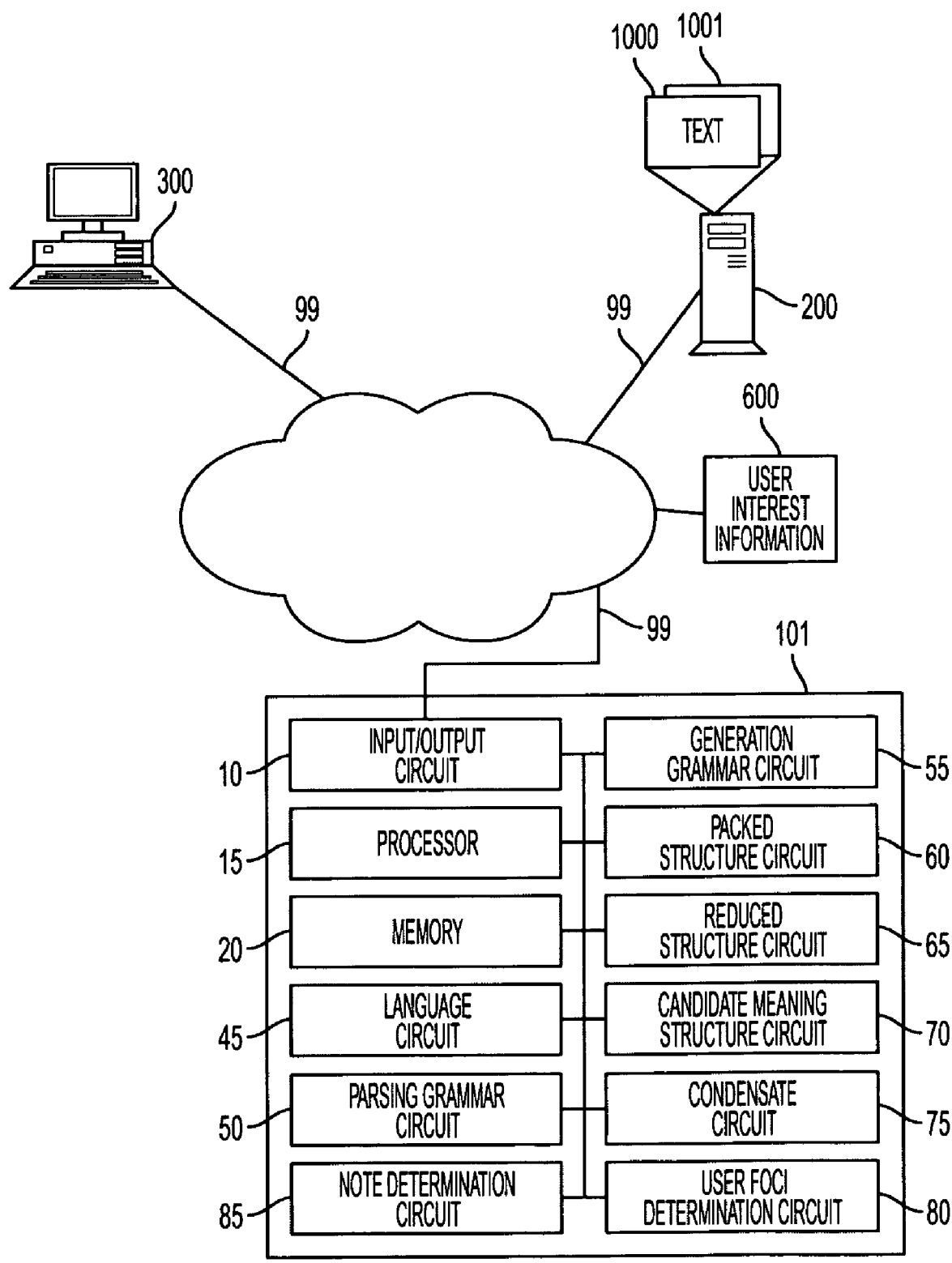
FIG. 7 is a second exemplary user-interest sensitive note taking system according to this invention.

FIG. 7 is a second exemplary user-interest sensitive note taking system 101 according to this invention. The user-interest sensitive note taking system 101 comprises a processor 15; a memory 20; a language circuit 45; a parsing grammar circuit 50; a generation grammar circuit 55; a packed structure circuit 60; a reduced structure circuit 65; a candidate meaning structure circuit 70; a condensate circuit 75; a user foci determination circuit 80 and a note determination circuit 85; each connected to an input/output circuit 10 and via communications link 99 to a communications enabled personal computer 300; an information repository 200 serving texts 1000-1001; and an optional user interest information repository 600.

A user of the communications-enabled personal computer 300 initiates a request for a user-interest sensitive note representing a passage of text 1000. The input/output circuit 10 of the user-interest sensitive note taking system 101 receives the request and the passage from text 1000 over communications links 99 from the information repository 200.

The processor 15 activates the input/output circuit 10 to retrieve the user interest information from the memory 20 and/or user interest information repository 600. The user interest information indicates concepts of interest to the user. The user interest information may be expressed using one or more terms, synonyms, hypernyms, hyponyms and/or any known or later developed method of describing and/or defining the information of interest to the user.

The processor 15 activates the language circuit 45 to determine the language of the passage. The language circuit 45 uses XML tags, characteristics of the passage and/or any known or later developed means for determining the language of the passage.

The processor 15 activates the packed structure circuit 60 to determine one or more packed meaning structures for the passage. The parsing grammar circuit 50 is activated to determine the parsing grammar based on the style or genre and/or the language of the passage. The processor 15 uses the parsing grammar to encode the passage into a packed meaning structure. The packed structure may include, but is not limited to the packed f-structure of the Xerox Linguistic Environment (XLE), the feature structures of head-driven phrase structure grammars, the trees of tree-adjoining grammars or any known or later developed text structure capable of encoding the meaning of the passage.

The user foci determination circuit 80 is activated to determine the user interest foci within the packed structure. For example, in one exemplary embodiment, literal matches between elements in the user interest information and the elements of the packed structure are determined. In still other exemplary embodiments, matches between elements of the user interest information and the elements of the packed structure are based on conceptual and/or other types of similarity.

The processor 15 activates the reduced structure circuit 65 to remove less salient information from the packed structure. In various embodiments, the determined user interest foci indicate meaning structure elements of subjective importance to the user. The condensation transformations and one or more meaning distortion constraints previously stored in memory 20 are applied to the packed structure to determine a reduced packed structure. The condensation transformations and the one or more meaning distortion constraints are applied to the packed structure to retain as many of the user interest foci as possible while ensuring the resultant reduced packed structure does not distort the meaning of the passage.

Candidate structures are extracted from the reduced packed structure by the candidate meaning structure circuit 70. The stochastic disambiguation model is retrieved from memory 20 and used to select the likely candidate structures. The generation grammar circuit 55 determines a generation grammar. The condensate circuit 75 is activated to determine the candidate condensates based on the candidate meaning structures and the generation grammar.

The note determining circuit 85 is activated to determine the user-interest sensitive note based on the candidate condensates and the passage. In various exemplary embodiments, the passage is presented to the user as a possible candidate condensate available for selection. This ensures a fail-soft operation, providing easy access to the original passage if the user decides that the condensates are unsatisfactory.

The condensate is then optionally associated with the passage. The condensation portion and the optionally associated passage portion of the user-interest sensitive note are then selectively displayed to the user. For example, in various embodiments, the condensate portion acts as a selectable link. When the link is selected the display of the associated passage portion of the user-interest sensitive note is expanded, compressed and/or otherwise transformed. This preserves the focus and context of the information allowing the user to more easily use the note to refresh their memory, obtain details from the passage that were omitted from the condensate, substantiate arguments predicated on the meaning and the like. The generated note, including the condensate portions and associated passage portions are output and/or inserted into the note file. The processor 15 repeats the process as passages in text 1000 are selected by the user.

Figure 8:
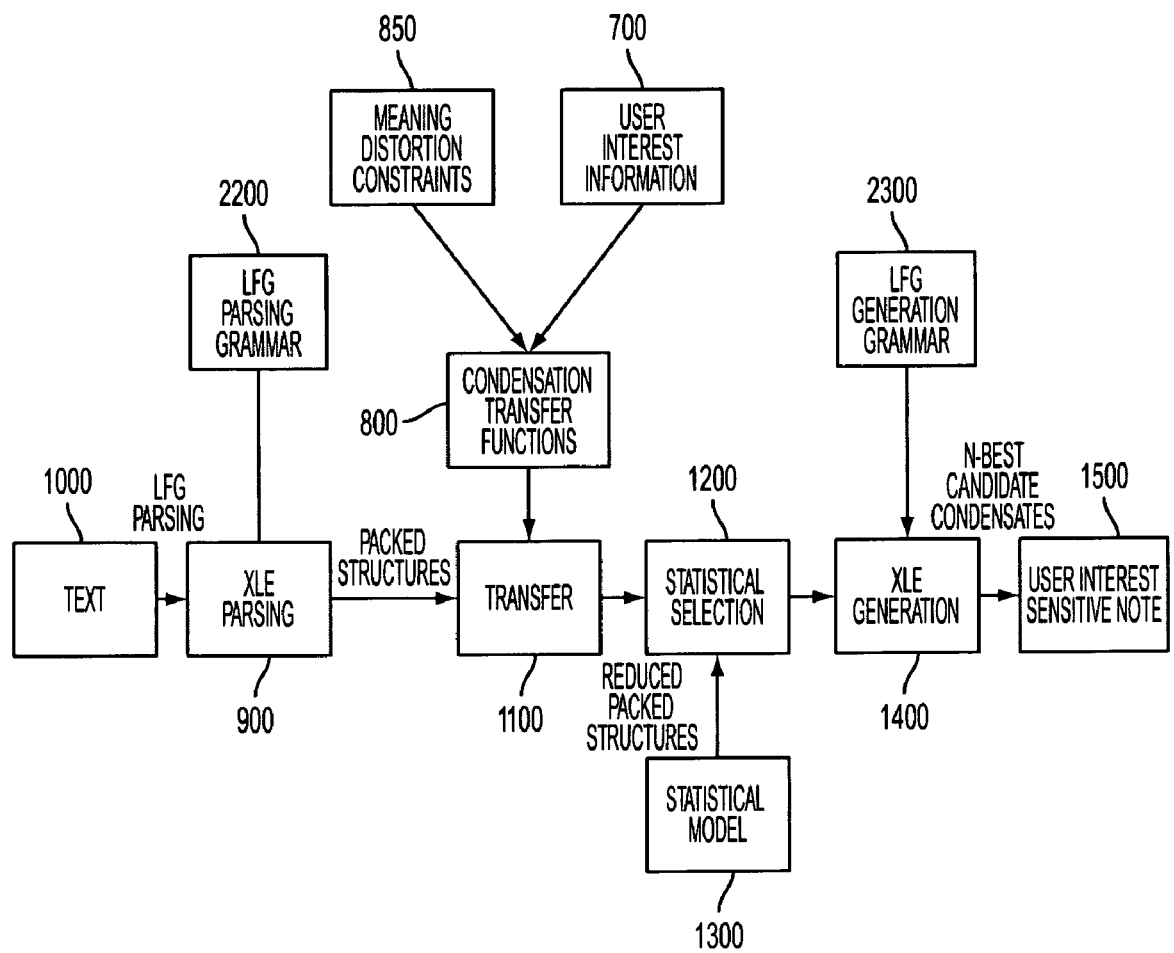
FIG. 8 is an overview of an exemplary user-sensitive note taking system according to this invention.

FIG. 8 is an overview of an exemplary user-interest sensitive note taking system 100 according to this invention. A passage of text of at least one multi-word sentence is selected from text 1000. The packed meaning structures associated with the passage are determined by the Xerox Linguistic Environment (XLE) 900 using a Lexical Functional Grammar (LFG). User interest information 700 and optional meaning distortion constraints 850 are selectively applied in conjunction with the condensation transfer functions 800 to determine reduced packed structures. A statistical disambiguation model 1300 is used to select candidate packed structures in statistical selection 1200. A generation grammar such as a Lexical Functional Generation Grammar 2300 is used to create one or more optionally grammatical condensates. The user selects one of the grammatical condensates as representative of the meaning of the passage. In various embodiments, the condensates are optionally associated with the passage to form a user-interest sensitive note. The user-interest sensitive note is stored in a note file. A user retrieves the note and selectively displays all, or portions of the user-interest sensitive note by selecting user-interface elements dynamically associated with it based on the user interest information. The resultant user-interest sensitive note is capable of displaying the condensate as well as the optional associated passage.

FIG. 9 is an exemplary passage to be condensed according to this invention. The exemplary passage contains a sentence with several modifiers. For example, one portion of the sentence gives a detailed description of how a dish of plague was transported through the gates of the fortress. The description of the manner in which the dish was transported through the gates does not coincide with information in which the user has expressed an interest. Thus one appropriate condensate for this passage is "Igor Domarsky carried a dish with a culture of plague through the gates." Although the condensate portion of the user-interest sensitive note lacks the manner description, the note is suitable for the user's task.

FIG. 10 is a first exemplary data structure for storing user interest information according to this invention. Each row in the data structure for storing user interest information contains a user interest element. The elements are optionally expanded and/or reduced using logic operators such as and/or operators, expansion operators, negation and/or any known or later developed method of describing a concept. The expansion of the element may be accomplished by consulting a thesaurus and/or ontologies such as WordNet and the like.

The first row contains the entry {"Igor Domaradsky"|Igor}. This entry describes how "Igor Domaradsky" is represented as either the full name "Igor Domaradsky" or by the first name "Igor".

The second row contains the entry+{disease*2}. This indicates that the concept described by the second element of the user interest information is associated with the term "disease". The "*" symbol indicates that the concept is described by WordNet synonyms, hyponyms and hypernyms within 2 links of "disease" in the WordNet lexicon. Thus, hyponyms such as viral and bacterial infections are included within one link. Specific diseases such as Ebola, plague, pneumonia and various others are captured within a second link. The "+" character preceding the term indicates the concept is to be added to the concepts of interest to the user. Similarly, the "−" character may be used to indicate concepts of disinterest to the user.

The third row contains the entry '+{"bio-terrorism"*}'. This indicates that the concept described by the third element is associated with the term "bio-terrorism" and the set of synonyms, hyponyms and hypernyms within a default value of 1 link of "bio-terrorism" in the WordNet lexicon.

Figure 11:
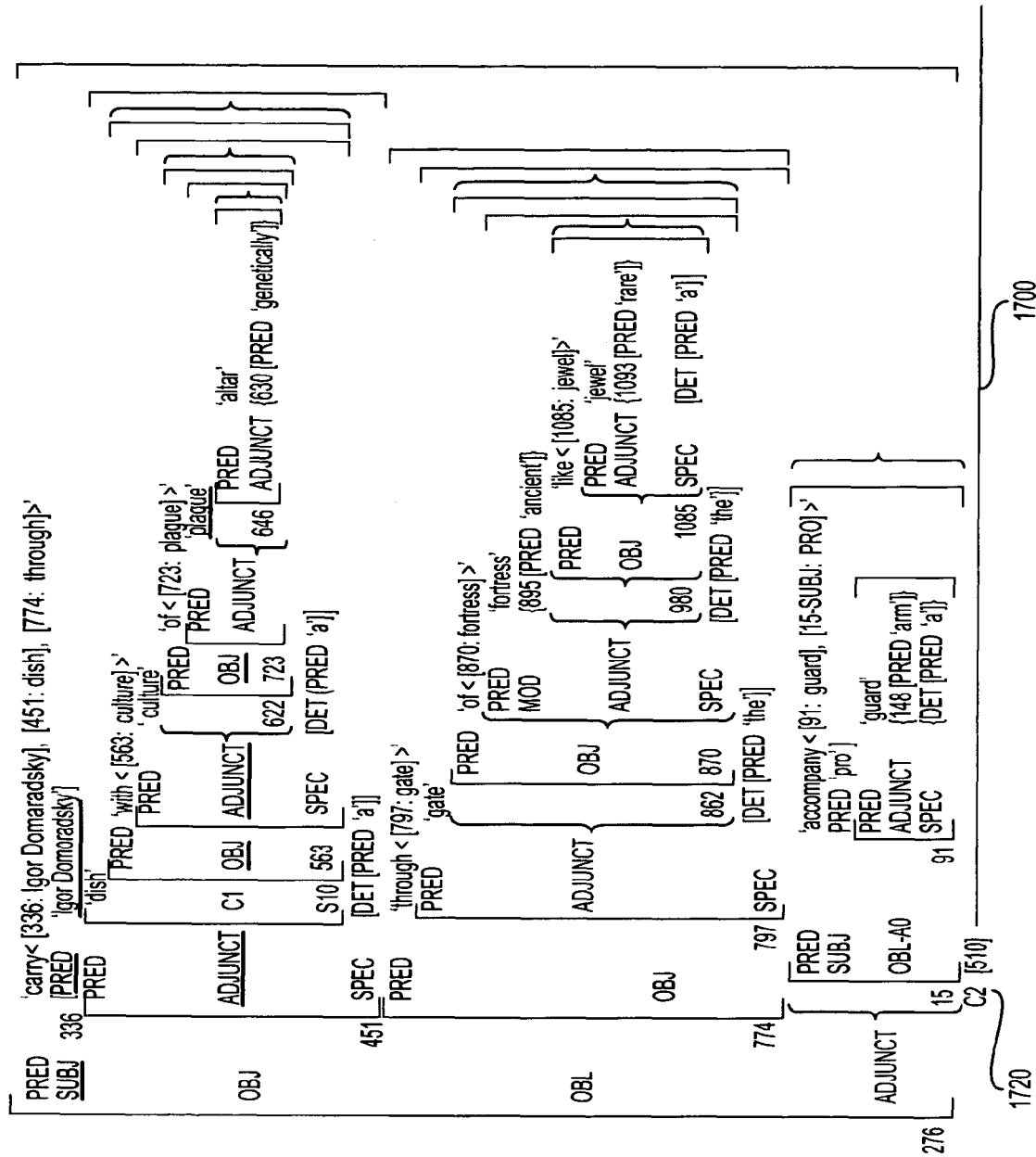
FIG. 11 is an exemplary packed structure according to this invention.

FIG. 11 is an exemplary packed structure 1700 according to this invention. The exemplary packed structure 1700 reflects an encoding of the sentence of FIG. 9 into a packed f-structure of the Xerox Linguistic Environment. Two possible readings of the sentence are indicated by choices C1 1710 and C2 1720. The first choice illustrates the reading of the sentence in which "with" further qualifies the dish that Igor carried. In contrast, choice C2 1720 illustrates a reading of the sentence in which, Igor carrying the dish, is accompanied by the "culture of genetically altered plague".

The "Igor Domaradsky" and "plague" elements of the user interest information are highlighted within the exemplary packed structure 1700. The underlined elements represent the information of greatest interest to the user as indicated by the elements of the user interest information. The elements of the packed structure that are underlined are preferentially retained and/or associated with a higher likelihood of being retained. Elements that are not underlined can be suppressed and/or elided without unduly affecting the suitability of the passage for the user.

Figure 12:
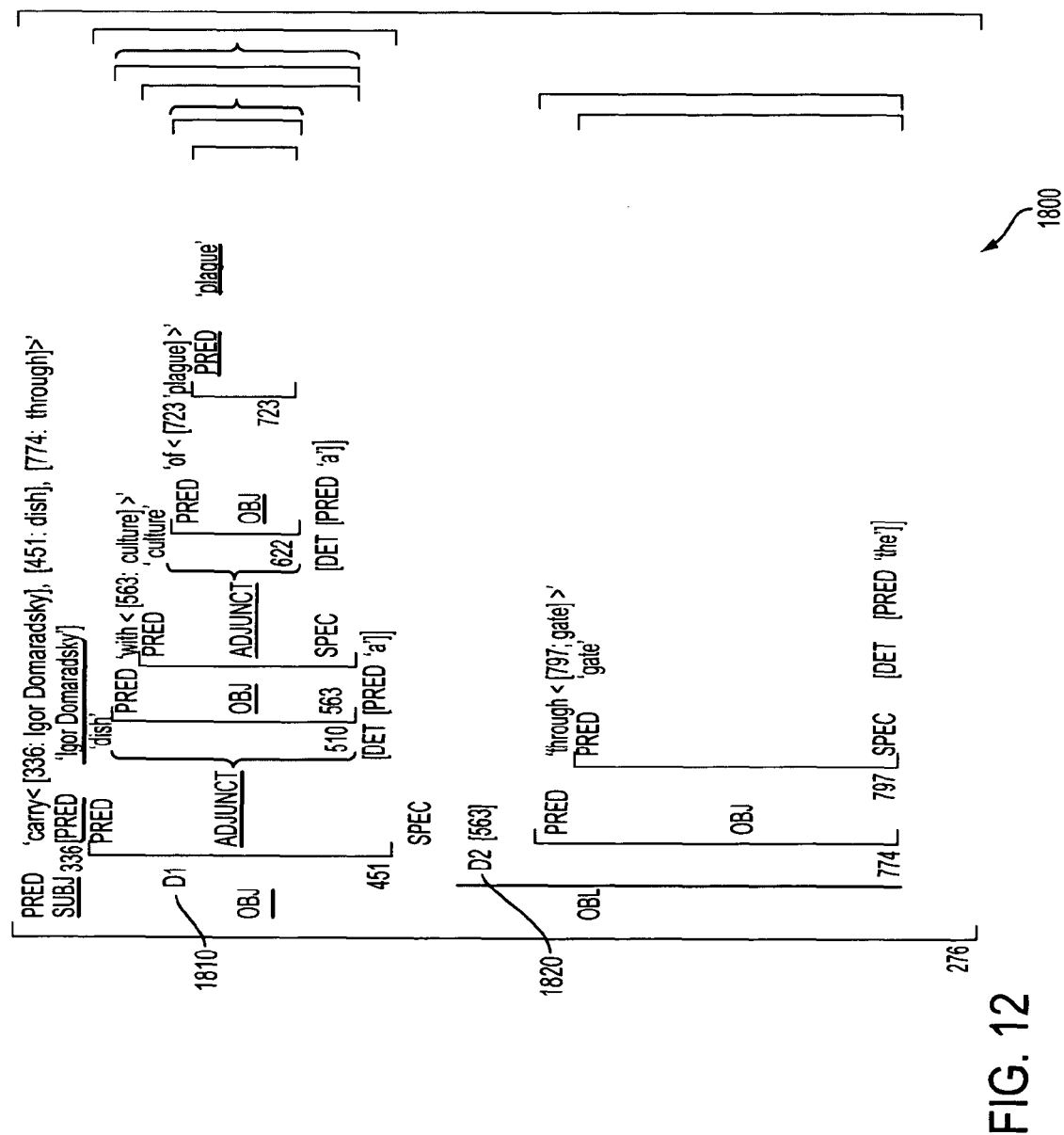
FIG. 12 is an exemplary reduced packed structure according to this invention.

FIG. 12 is an exemplary reduced packed structure according to this invention. The reduced structure of FIG. 12 is the result of applying condensation transformations to the full structure of FIG. 11. For clarity of discussion, only the reduced structure for the second choice C2 is illustrated in FIG. 12. The exemplary packed structure is encoded as a Xerox Linguistic Environment packed f-structure. The user interest information associated with the elements "Igor" and "plague" are underlined. The underline is associated with literal matches between elements in the packed structure and elements in the associated user interest information. The matched elements of the packed structure are user foci. However, it will be apparent that various matching strategies can be used to expand the scope of matching between elements of the user interest information and the elements of the packed structure.

Condensation transformations are applied to a packed structure. The resultant reduced packed structure conveys the meaning of the passage in a compact format targeted towards the user's specific interest and which is a good indication of the meaning of passage. For example, if the user had indicated an interest in "ancient" and "fortress", then the applied transformations would increase the likelihood that the terms "ancient" and "fortress" appear in the resultant packed structure. The optional meaning distortion constraints decrease the likelihood of a reduced packed structure that distorts the meaning of the passage. Thus, in various embodiments, condensates generated from the reduced packed structures and which are plausibly inferred, entailed and/or implied from the passage do not distort the meaning of the passage.

The elements D1 1810 and D2 1820 indicate two choices for the phrase. Choice D1 1810 includes both the dish and the culture. However, by the application of the various exemplary condensation transformations, the phrase "containers of X" is recognized and reduced to "X". This illustrates the effect of an exemplary condensation transformation that optionally deletes the term "containers", motivated by the fact that the containers are possibly of less significance then the substance they contain.

Figure 13:
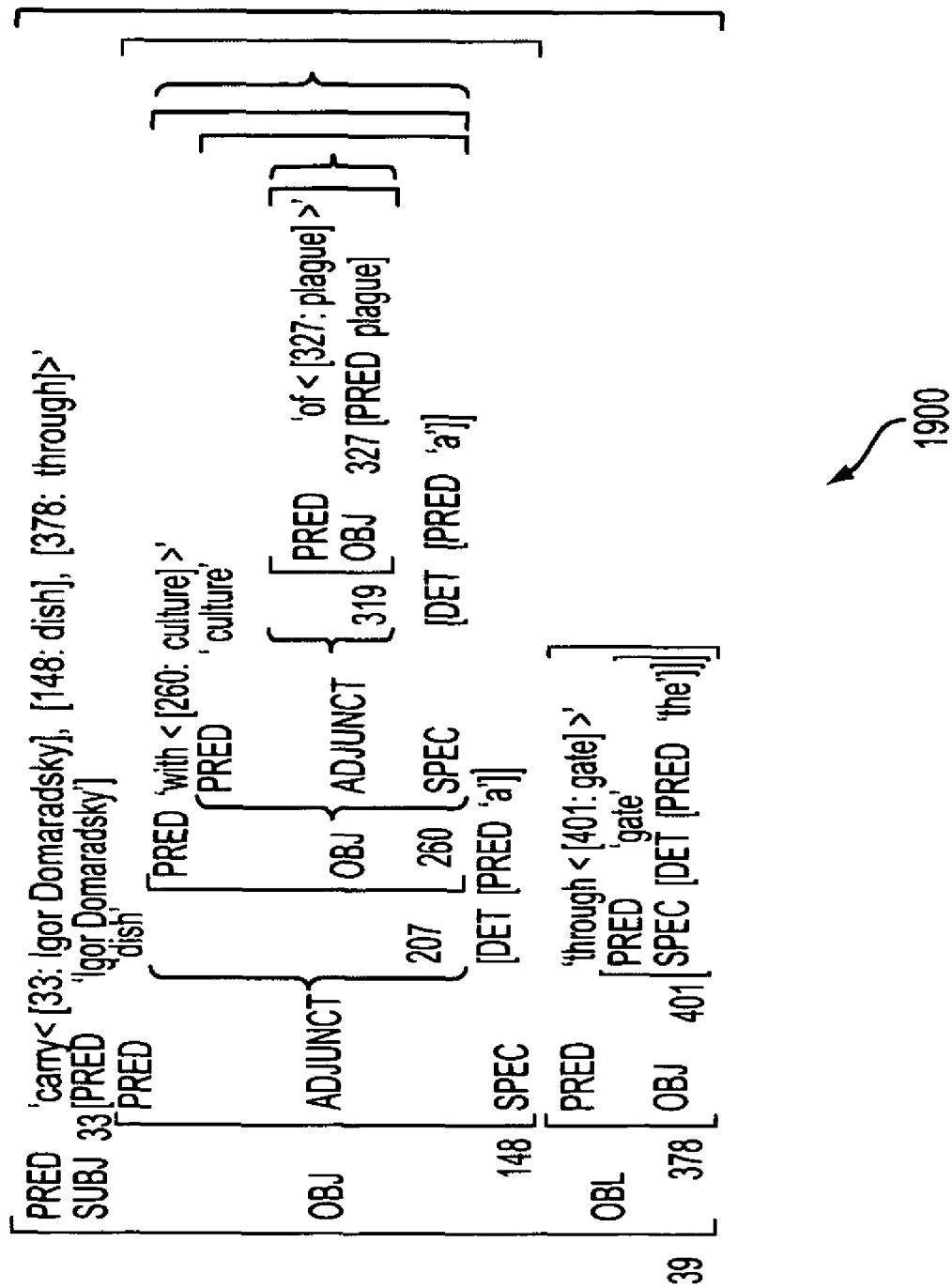
FIG. 13 is a second exemplary reduced packed structure according to this invention.

FIG. 13 is a second exemplary reduced packed structure according to this invention. FIG. 13 is a more compact version of FIG. 12 in which the white space indicating the elided elements has been removed. In the reduced packed structure elements conceptually similar to user interest information elements are preserved and/or prioritized. The user interest information contained in the packed structure is retained while less salient information is removed.

For example, the information describing how the dish was taken through the gates, is removed. The elided information is less relevant to the user's explicitly stated interest in "Igor Domaradsky" and the "plague". The condensed output retains the interesting aspects of the passage's meaning. For example, the candidate condensate, "Igor Domaradsky carried a dish with a culture of plague through the gate" can be generated from the reduced packed structure. The 28 words of the passage have been reduced to the 13 user-interest focused words of the condensate.

The identification of user foci in the packed structure can be based on literal equivalence between elements in the user interest information and the elements of the packed structure. However, in various other exemplary embodiments, the user foci within the packed structure are related by concept matching. For example, the "*" symbol following the element "container" indicates a set of synonyms, hypernyms and hyponyms within 2 links of the word "container" in the WordNet lexicon. In still other exemplary embodiments, other lexicons such as the Suggested Upper Merged Ontology (SUMO), Cyc and the like are used, alone or in combination, to determine concepts expressed by the user interest information. In still other embodiments, the statistical similarity of elements can be used to determine the degree of match.

FIG. 14 is a second exemplary data structure for storing user interest information according to this invention. The first row contains the entry {fortress*3}. This entry indicates how the concept of a "fortress" is represented by the specific term "fortress". The concept description also includes synonyms, hypernyms, and hyponyms that are within 3 links of the term "fortress" in the WordNet lexicon. It should be apparent that the practice of this invention is not limited to the use of the WordNet lexicon. Any known or later developed lexicon, ontology and/or system capable of representing concepts can be used, either alone or in combination, to represent the user interest information without departing from the scope of this invention.

The second row contains the entry {archaeology*}. This indicates that the user is interested in the term "archaeology" and all synonyms, hypernyms and hyponyms within a default "1" link of the term in the WordNet lexicon.

The third row contains the entry {bronze age*}. This entry indicates that the user is interested in the concept of the "bronze age". The concept is defined by the term "bronze age" and all synonyms, hypernyms and hyponyms within a default value of 1 link of the term in the WordNet lexicon.

The fourth contains the entry "c:\home\user_a\file_history". This indicates that the concepts defining the user's interest in history should be read from the file accessible at "c:\home\user_a\file_history".

The fifth row contains the entry "c:\home\user_a\file_project1". This indicates the filename from which concept terms describing the user interest information associated with project1 should be read. Project1 refers to a collaborative project. The concept terms specified in the file include terms that are incrementally learned and/or otherwise adjusted by the project team members. The encapsulation of the concept terms within a single file allows team members to quickly share group knowledge with other persons.

The sixth row contains the entry '-{"container*2"}. The "-" sign indicates a term in which the user has expressed disinterest. The term and related concepts are therefore excluded from the concepts of interest to the user. This indicates that synonyms, hypernyms and hyponyms within 2 links of "container" are excluded or down-weighted from the concepts of interest to the user. For example, the choice D1 of FIG. 12 would be suppressed and only the reduced meaning indicated by choice D2 would be created.

In one of the various exemplary embodiments, the values of each row in the data structure for storing user interest information are joined together by an implicit logical 'OR' operation. In an exemplary embodiment in which the note is displayed to the user, different sets of user interest information are associated with different tags, display characteristics and the like. For example, user foci associated with the elements contained in the file "file_project1" are displayed using a "project1" tag, a red color display characteristic and the like. In contrast, the user foci associated with the elements contained in the "file_history" user information are associated with a "history" tag, a yellow display characteristic and the like.

The user foci that are similar to the user interest elements are displayed in a bold font characteristic. The less similar elements are displayed in italics and/or any known or later identified human sensible display characteristic. This allows the user to quickly understand how closely the condensed text is related to a concept of interest. The display characteristics include, but are not limited to, color, font, italics, bolding, sound, touch and/or any known or later developed human sensible characteristic.

FIG. 15 is an exemplary data structure for storing meaning distortion constraints 2100 according to this invention. The data structure for storing meaning distortion constraints is comprised of a pattern portion 2110 and an action portion 2120. The pattern portion 2110 contains constraints that are matched before the associated action rule is activated.

The first row of the exemplary data structure for storing meaning distortion constraints 2100 contains the value "-DOWNWARD_MONOTONIC (P)" in the pattern portion 2110. The preceding "-" character indicates negation. Thus, this pattern constraint is matched if the predicate "P" is not downward monotonic. In various exemplary embodiments, the downward monotonicity characteristic of a text predicate is determined based on functions within the Xerox Linguistic Environment (XLE), a lookup operation on an ontology and/or lexicon, and/or by using any now or later developed method of determining downward monotonicity.

The action portion 2120 of the exemplary data structure for meaning distortion constraints 2100 contains the rewrite rule "CONDENSE_MODIFIERS (P)". The rewrite rule is activated if the constraints in the pattern portion 2110 are satisfied. The rewrite rule contained in the action portion 2120 condenses modifiers if the predicate is not downward monotonic. That is, the modifiers in the passage are condensed only if the meaning of the passage would not be modified by the condensation.

For example, an exemplary lexicon may encode information that the word "prevent" is downward monotonic and the word "cause" is not. Thus, the presence of the word "prevent" in the phrase "the president prevented a long strike" indicates the phrase is downward monotonic. Thus, the phrase cannot satisfy the pattern portion 2110 of the meaning distortion constraint. The associated rewrite rule in the action portion 2120 is not activated to condense the modifiers in the sentence. Thus, meaning distorting condensates such as "the president prevented a strike" are less likely to be generated. On the other hand, the likelihood of condensing "the president caused a long strike" to "the president caused a strike" will not be decreased.

The second row contains the value "PASSIVE(P), SUBJ (P,S), BY-OBJ(P,O)" in the pattern portion 2110. This indicates that the associated action rule of the action portion 2120 is activated if some predicate P is passive, has a subject S and a BY preposition phrase with object O.

The action portion 2120 contains the value "SUBJ(P,O), OBJ(P,S)". This indicates that if the constraints of the associated pattern portion 2110 are satisfied, the passive mark is removed making the sentence active, the BY(O) object is made the subject and the original subject S is made the object. Thus, for example, the phrase "John was seen by Bill" is condensed to "Bill saw John". This condensation transformation changes the phrase "was seen" to the phrase "saw" and switches the subject and object in the sentence to avoid meaning distortion of the passage.

FIG. 16 is a view of a user-interface 2800 for an exemplary user-interest sensitive note-taking system according to a first aspect of this invention. The exemplary user-interface 2800 is comprised of a text portion 2500; a note file portion and a user interest information portion 2700.

The text portion 2500 contains first, second, third, fourth and fifth passages 2510-2550. The passages may be newswire services, web pages retrieved from a web server and/or any other source information to be condensed. The text source 2550 has been selected as a passage to be condensed.

The user-interest sensitive note file portion 2600 contains three user-interest sensitive notes 2610, 2620, 2630. Notes 2610 and 2620 correspond to previously selected and noted passages 2510 and 2540. Note 2630 corresponds to the highlighted passage 2550. The user-interest sensitive notes 2610-2630 are comprised of condensate portions 2611, 2621 and 2631 and associated optional passage portions (not shown). The condensate portions 2611, 2621 and 2631 are optionally associated with selectable user interface elements and/or links. The user interface elements and/or links are operable to conceal or reveal the associated optional passage portions (not shown) and/or various other portions of the user-interest sensitive note.

The user-interest information is reflected in the user-interest information portion 2700. The user-interest information portion 2700 includes concepts 2711-2713 of interest to, and/or disinterest to, the user. Interesting concepts are preceded by the "+" character. Disinteresting terms are preceded by the "−" character. The terms are enclosed with braces. Multiple terms within a set of braces are joined together with an implied "AND" operator while the "|" character represents an "OR" operation between terms.

The second and third passages 2520-2530 have not been selected for condensation and are therefore not associated with a corresponding user-interest sensitive note. However, the first, fourth and fifth passages 2510, 2540 and 2550 are summarized by the first, second and third user-interest sensitive notes 2610-2630 respectively.

An optional indicator character "A" signals that the passage information is displayed. For example, by selecting and/or moving the mouse over the condensate, the optionally associated passage is expanded. The optional indicator character "*" indicates the start of the display of the optionally associated passage portion. The optional character ">" indicates that additional information is available by selecting the link. It will be apparent that various indicators may be used to indicate additional information without departing from the scope of this invention.

Figure 17:
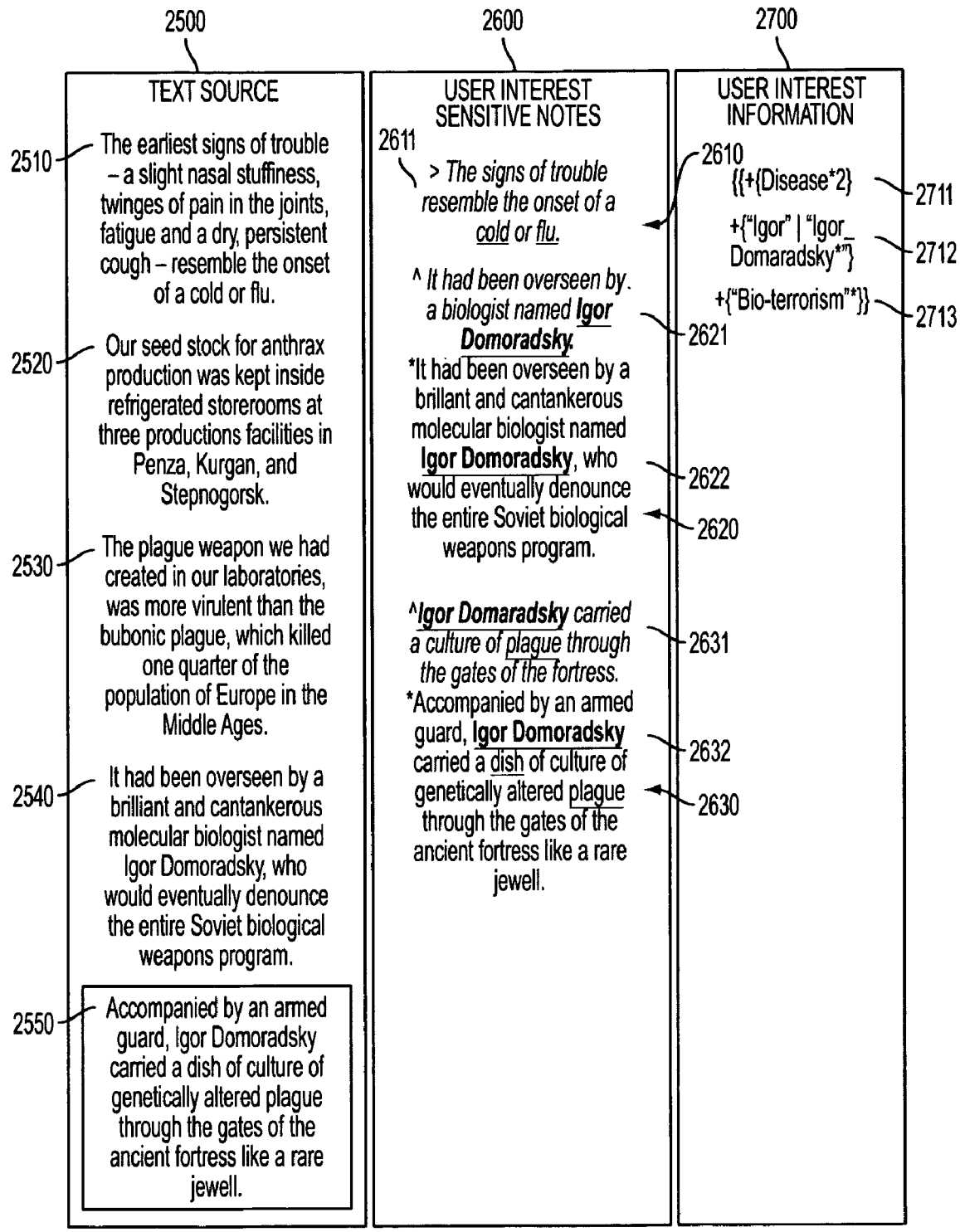
FIG. 17 is a view of a user interface for an exemplary user-interest sensitive note-taking system according to a second aspect of this invention.

FIG. 17 is a view of a user-interface 2800 for an exemplary user-interest sensitive note-taking system according to a second aspect of this invention. The exemplary user-interface 2800 is comprised of a text portion 2500; a note file portion and a user interest information portion 2700.

The user-interest sensitive note file portion 2600 contains three user-interest sensitive notes 2610, 2620, 2630. Notes 2610 and 2620 correspond to previously selected and noted passages 2510 and 2540. Note 2630 corresponds to the highlighted passage 2550. The user-interest sensitive notes 2610-2630 are comprised of condensate portions 2611, 2621 and 2631 and associated optional passage portions 2622 and 2632. The condensate portions 2611, 2621 and 2631 are optionally associated with selectable user interface elements and/or links. The user interface elements and/or links are operable to conceal or reveal the associated optional passage portions 2622-2632 and/or various other portions of the user-interest sensitive note.

The user-interest information is reflected in the user-interest information portion 2700. The user-interest information portion 2700 includes concepts 2711-2714 of interest to, and/or disinterest to, the user. Interesting concepts are preceded by the "+" character. Disinteresting terms are preceded by the "−" character. The terms are enclosed with braces. Multiple terms within a set of braces are joined together with an implied "AND" operator while the "|" character represents an "OR" operation between terms.

The second and third passages 2520-2530 have not been selected for condensation and are therefore not associated with a corresponding user-interest sensitive note. However, the first, fourth and fifth passages 2510, 2540 and 2550 are summarized by the first, second and third user-interest sensitive notes 2610-2630 respectively.

In the various embodiments of the user-interest sensitive note taking systems 100-101, each of the circuits 10-85 outlined above can be implemented as portions of a suitably programmed general-purpose computer. Alternatively, 10-85 of the user-interest sensitive note taking systems 100-101 outlined above can be implemented as physically distinct hardware circuits within an ASIC, or using a FPGA, a PDL, a PLA or a PAL, or using discrete logic elements or discrete circuit elements. The particular form each of the circuits 10-85 of the user-interest sensitive note taking systems 100-101 outlined above will take is a design choice and will be obvious and predictable to those skilled in the art.

Moreover, the user-interest sensitive note taking systems 100-101 and/or each of the various circuits discussed above can each be implemented as software routines, managers or objects executing on a programmed general purpose computer, a special purpose computer, a microprocessor or the like. In this case, the user-interest sensitive note taking systems 100-101 and/or each of the various circuits discussed above can each be implemented as one or more routines embedded in the communications network, as a resource residing on a server, or the like. The user-interest sensitive note taking systems 100-101 and the various circuits discussed above can also be implemented by physically incorporating the user-interest sensitive note taking systems 100-101 into software and/or hardware system, such as the hardware and software systems of a web server or a client device.

As shown in FIGS. 4 & 6, memory 20 and 30 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1, 4 and 6 can each be any known or later developed device or system for connecting a communication device to the user-interest sensitive note taking systems 100-101, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method comprising the steps of:
   determining a user selected passage by highlighting, marking, or cut and pasting a block of text using a computer operable input device;
   determining user interest information;
   determining a parsing grammar and a generation grammar;
   determining a meaning structure based on the selected passage;
   transforming the user selected passage and the user interest information into condensation transformations comprised of rewrite rules which delete, merge and change elements of the meaning structure;
   determining meaning distortion constraints beyond which the meaning structure is identified as being distorted after the condensation transformations are applied;
   determining a packed meaning structure based on the selected passage and the determined parsing grammar;
   determining a reduced meaning structure based on the condensation transformations, the packed meaning structure, the user information, and the meaning distortion constraints;
   determining at least one candidate condensation structure based on the reduced meaning structure and a predictive model or a statistical disambiguation model; and
   determining a user-interest note based on the candidate condensation structures and the determined generation grammar.

2. The method of claim 1, in which determining the note further comprises the step of prioritizing the retention of the elements of the passage that match elements of the user interest information.

3. The method of claim 2, in which the matches are determined based on at least one of: literal, distributional, statistical, and co-occurrence similarity.

4. The method of claim 3, in which the conceptual similarity is based on at least one of: a lexicon; an ontology; statistics and a machine-readable information source.

5. The method of claim 1, in which the meaning structure is determined based on a parsing grammar.

6. The method of claim 5, in which the parsing grammar is determined based on at least one of: a characteristic of the passage and user preference.

7. The method of claim 6, in which the characteristic of the passage is at least one of: a language and a genre characteristic.

8. The method of claim 1, in which the note is comprised of grammatical sentences.

9. The method of claim 1, in which the passage is at least one sentence.

10. The method of claim 9, in which the at least one sentence is comprised of at least two words.

11. The method of claim 1, in which the packed meaning structure is at least one of: a logical formula in the predicate calculus, a collection of semantic facts, a head-driven phrase structure and an f-structure.

12. The method of claim 1, in which the passage is converted into meaning structures using a parsing grammar.

13. The method of claim 1, in which the condensation rules are re-write rules.

14. The method of claim 1, in which the condensation transformations are applied to the meaning structures based on meaning distortion constraints.

15. The method of claim 14, in which the meaning distortion constraints are useable to adjust the condensation of meaning structures characterized as downward monotonic.

16. The method of claim 15, in which the meaning distortion constraint adjustment is at least one of: preventing condensation and repairing meaning in the meaning structure.

17. The method of claim 1, in which the determined note is comprised of a portion that signals the meaning of the passage.

18. The user-interest sensitive note-viewing system as determined by the method of claim 1 comprising:
   a computer operable memory;
   an input/output circuit that receives user input and retrieves stored user-interest sensitive notes from memory; and
   a processor that displays the user-interest sensitive note, wherein the user-interest sensitive note can edited by at least one user.

19. The system of claim 18, in which the input/output circuit interprets user-interest information and the processor dynamically updates the condensate portion of the user-interest sensitive note based on the retrieved user-interest information.

20. The system of claim 19, in which the user interest sensitive note is comprised of a condensate portion.

21. The user interest sensitive note as determined by the method of claim 1, in which the user-interest sensitive note is comprised of at least one condensate and in which a user selected link provides access to the passage.

22. A system for generating a user-interest note comprising:
   a processor that selects a text passage by highlighting the text or by inputting the text; user interest information received from at least one of entered keywords, monitored internet browsing patterns, and user academic or professional information; at least one condensation transformation expressed as rewrite rules and functions which reduces the selected passage by merging, deleting and changing the elements of the selected passage to remove modifiers and less salient information; a meaning structure determined by using a parsing grammar; a reduced meaning structure derived from the selected passage and based on input user information; meaning distortion constraints beyond which the meaning structure is identified as being distorted after the at least one condensation transformation is applied; and a plurality of candidate condensate based on the reduced meaning structure which are optimally ranked based on a predictive model or a statistical disambiguation model;
   wherein the processor further selects a user-interest note from the candidate condensates based on the input user interests.

23. The system of claim 22, in which elements of the passage that match elements of the user interest information are preferentially retained.

24. The system of claim 23, in which the matches are determined based on at least one of: literal, conceptual, distributional, statistical, and co-occurrence similarity.

25. The system of claim 24, in which the conceptual similarity is based on a lexicon; an ontology; statistics and a machine-readable information source.

26. The system of claim 22, in which the processor determines a meaning structure for the passage; and further determines the condensate based on elements of the meaning structure that match elements of the user interest information.

27. The system of claim 26, in which the meaning structure is determined based on a parsing grammar.

28. The system of claim 27, in which the parsing grammar is determined based on at least one of: a characteristic of the passage and user preference.

29. The system of claim 28, in which the characteristic of the passage is at least one of: a language and a genre characteristic.

30. The system of claim 26, in which the meaning structure is a packed meaning structure.

31. The system of claim 30, in which the packed meaning structure is at least one of: a logical formula in the predicate calculus, a collection of semantic facts, a head-driven phrase structure and an f-structure.

32. The system of claim 22, in which the condensate is comprised of grammatical sentences.

33. The system of claim 22, in which the passage is at least one sentence.

34. The system of claim 33, in which the at least one sentence is comprised of at least two words.

35. The system of claim 22, in which the passage is converted into at least one meaning structure using a parsing grammar.

36. The system of claim 22, in which the condensation rules are re-write rules.

37. The system of claim 22, in which the passage is converted into a packed meaning structure and the condensation transformations are applied to the packed structure based on meaning distortion constraints.

38. The system of claim 37, in which the meaning distortion constraints adjust the condensation of the meaning structures characterized as downward monotonic.

39. The system of claim 38, in which the meaning distortion constraint adjustment is at least one of: preventing condensation and adjusting the meaning in the meaning structure.

40. A method of creating a user-interest note comprising the steps of:
  determining a passage by highlighting text or by entering text;
  determining user interest information by at least one of entered keywords, monitored Internet browsing patterns, and user academic or professional information;
  determining condensation transformations expressed as rewrite rules and functions;
  determining at least one reduced passage based on user interest information;
  determining meaning distortion constraints beyond which the at least one reduced passage is identified as being distorted after the condensation transformations are applied;
  determining at least one text condensate based on comparison between the reduced passage, the user interest information, and the condensation transformations; and
  selecting one user-interest note from the at least one reduced passage.

41. A method of using a computer to generate a user-interest note, the method comprising:
  selecting a text input passage by use of a computer to highlight text or input text;
  parsing the input passage into elements using a computer processor;
  determining user foci based on similarities between the user information and the elements of the selected text input passage;
  determining a condensation transformation expressed as rewrite rules and functions which reduce the selected passage by merging, deleting, and changing the elements of the selected passage;
  determining a reduced passage text note by removing information from the passage based on the condensation transformation, the user foci, and the user interest information;
  and
  determining meaning distortion constraints beyond which the reduced passage text condensation is identified as being distorted after the condensation transformation is applied to the passage.

42. A computer readable storage medium comprising computer readable program code embodied on the computer readable storage medium, the computer readable program code usable to program a computer for generating a user-interest note comprising the steps of:
  determining a passage by highlighting one or more multi-word sentences through use of a computer mouse controlled cursor wherein a mouse button is held down as the cursor is dragged over a selected passage in order to capture the passage;
  determining user interest information by parsing the text of the user selected passage to determine alternative meaning structures associated with the passage;
  determining condensation transformations expressed as rewrite rules and functions which reduce the selected passage by deleting, merging, and/or adjusting the element of alternative meaning structures in order to compare user interest information with alternative meaning structures;
  determining meaning distortion constraints beyond which the alternative meaning structures are identified as being distorted after the condensation transformations are applied; and
  applying a condensation transformation based on the determined passage, and the user interest information to condense facts in the alternative meaning structures to create condensed packed meaning structure.

43. A user-interest note derived by using a computer processor to transform a user selected passage of a text into a packed meaning structure which is at least one of:
  a logical formula in the predicate calculus,
  a minimal recursion semantic structure,
  a head-driven phrase structure, and
  an f-structure; and wherein the user interest note and is based on one or more input indicators of user interest and includes:
  a condensation transformation expressed as rewrite rules and functions which reduce the selected passage by merging, deleting, and changing elements of the selected passage;
  a reduced passage text note by removing information from the passage based on the condensation transformation, the user interest, and user interest information; and
  meaning distortion constraints beyond which the reduced passage text condensation is identified as being distorted after the condensation transformation is applied to the passage,
  wherein the meaning structure for a passage is created through the use of a stochastic disambiguation model and/or predictive model which assigns higher probabilities to better examples from a training set and assigns lower probabilities to less desirable or less appropriate examples.

44. The note of claim 43, further comprising at least one selectable user interface component operable to adjust a display of a portion of the user-interest note.

45. The note of claim 44, wherein the displayed portion of the user-interest sensitive note is at least one of: the passage portion and the condensate portion.

46. The note claim 44, wherein the user selectable interface component is at least one of: a button, a link and a uniform resource locator.

47. The note of claim 43, wherein the condensate contains information from the passage portion.

48. The note of claim 43, wherein the passage portion is displayed in at least one of: a window; a dialog box; a pop-up-box and a status area.

49. The note of claim 44, wherein the selectable user interface component is responsive to at least one of: voice, touch and eye-gaze input.

50. A method of creating a corrected user-interest note comprising the steps of:

determining a user selected text passage by highlighting or inputting one or more multi-word sentences;

parsing the user selected text into elements using a parsing grammar;

determining user interest information from at least one of entered keywords, monitored Internet browsing patterns, user academic information and user professional information;

determining condensation transformations expressed as rewrite rules and functions;

determining non-local references in the passage;

determining a note based on comparison between the determined passage, the user interest information, and the condensation transformations;

determining meaning distortion constraints beyond which the note is identified as being distorted after the application of at least one condensation transformation;

identifying dropped words and meaning distortions within the note; and producing a corrected note based on the text condensation and the addition of dropped words and repairing of meaning distortions.

* * * * *